US008693345B2

(12) United States Patent
Lee et al.

(10) Patent No.: US 8,693,345 B2
(45) Date of Patent: Apr. 8, 2014

(54) DYNAMIC MANAGEMENT OF WIRELESS NETWORK TOPOLOGY WITH DIVERSE TRAFFIC FLOWS

(75) Inventors: Seoung Bum Lee, Lexington, MA (US); Gowri Shankar Rajappan, Somerville, MA (US)

(73) Assignee: Mayflower Communications Company, Inc., Burlington, MA (US)

( * ) Notice: Subject to any disclaimer, the term of this patent is extended or adjusted under 35 U.S.C. 154(b) by 169 days.

(21) Appl. No.: 13/317,214

(22) Filed: Oct. 12, 2011

(65) Prior Publication Data

US 2013/0094366 A1 Apr. 18, 2013

(51) Int. Cl.
*H04L 12/28* (2006.01)
(52) U.S. Cl.
USPC .............................. 370/241; 370/255; 370/444
(58) Field of Classification Search
USPC .......................................... 370/241, 317, 444
See application file for complete search history.

(56) References Cited

U.S. PATENT DOCUMENTS

| 6,791,949 | B1 | 9/2004 | Ryu et al. | |
|---|---|---|---|---|
| 6,990,080 | B2 | 1/2006 | Bahl et al. | |
| 7,321,566 | B2 | 1/2008 | Fu | |
| 7,417,999 | B1 * | 8/2008 | Charny et al. ................. | 370/408 |
| 7,606,171 | B1 | 10/2009 | Young et al. | |
| 7,830,820 | B2 | 11/2010 | Duke et al. | |
| 8,331,267 | B2 | 12/2012 | Zhang et al. | |
| 2003/0204625 | A1 * | 10/2003 | Cain ............................ | 709/243 |
| 2006/0018252 | A1 * | 1/2006 | Sridhar et al. ................ | 370/216 |
| 2006/0039286 | A1 * | 2/2006 | Basu et al. .................... | 370/238 |
| 2007/0081556 | A1 | 4/2007 | Evans et al. | |
| 2007/0195746 | A1 | 8/2007 | Ryu et al. | |

OTHER PUBLICATIONS

D. M. Shrestha et al, "On Construction of the Virtual backbone in Wireless Mesh Networks", 8th Intl Conf on Adv Com. Technol., Feb. 20-22, 2006, pp. 209-221, S. Korea. All pages.
Chieh-Yih Wan et al., "Overload traffic management for sensor networks", ACM Transactions on Sensor Networks (TOSN), vol. 3 Issue 4, Oct. 2007, Article No. 18, All pages.
R. Sivakumar et al, "Routing in Ad hoc Networks using Spine", Proc. 6th Intl Conf on Computer Commun. and Networks, pp. 34-39,Las Vegas, Nevada, Sep. 22-25, 1997, All pages.
Xiuzhen Cheng et al., "Virtual backbone construction in multihop ad hoc wireless networks", Wireless Communications and Mobile Computing, 2006, pp. 183-190, All pages.
P.J. Wan et al. , "Distributed Construction of Connected Dominating Set in Wireless Ad Hoc Networks", IEEE Infocom 2002, pp. 1597-1604, vol. 3. Jun. 2002, NY, All pages.

* cited by examiner

*Primary Examiner* — Man Phan
*Assistant Examiner* — Mewale Ambaye
(74) *Attorney, Agent, or Firm* — Kaplesh Kumar

(57) ABSTRACT

System and method for topology management of dynamic ad hoc wireless communication networks. The network nodes are organized in a multi-level hierarchical architecture whereby the nodes at each level are managed by nodes at the next higher level. In a three-layer network, leaf nodes populate the lowest level, cluster head nodes the intermediate level, and regional head nodes the highest level. Priority-based backbone tree paths are constructed by selecting and connecting high capability nodes, such that the unselected nodes are one-hop away from a connected node. In a two backbone tree path construction, a primary backbone tree path carries the high priority traffic and a secondary backbone tree path carries the lower priority traffic. The connectivities of the backbone tree paths are maintained dynamically. So also are high priority traffic flows using the Dynamic Priority Threshold mechanism with High Fidelity Monitoring and traffic siphoning via unutilized network resources.

65 Claims, 19 Drawing Sheets

Figure 3

Neighborhood Status Table 300

| Node ID (IPv6 address) | Node Type | SNR (dB) Down:Up | BLQI | GPS Coordinate | Affinity (sec) | Associated CHs | Last Timestamp | Beacon Interval (ms) | Beacon Misses |
|---|---|---|---|---|---|---|---|---|---|
| 1001:1:0:0:8:800:200C:417A | Leaf | 45:42 | Good | N61° 11' 05.5" W130° 30' 10.0 | 328 | CH1:CH2:CH3 | 17:23:36:45.678 | 2 000 | 0 |
| 1001:1:0:0:345:8:417B:200C | Leaf | 50:44 | Good | - | 56 | CH1:CH3 | 17:23:36:44.019 | 1000 | 1 |
| ... | ... | ... | ... | ... | ... | ... | ... | ... | ... |
| 1001:1:0:345:80:17B:200C:F | Leaf | 18:21 | Poor | - | 256 | CH1: CH2 | 17:23:36:43.100 | 1000 | 1 |

Figure 4

Cluster Status Table 400

| Cluster ID | GPS Coordinates / BLQI | Associated RHs / BLQI | Neighboring CHs / BLQI | Associated Leaf Node IDs / BLQI | Leaf Nodes' Backup CHs / BLQI | Last Update (timestamp) |
|---|---|---|---|---|---|---|
| CH1 | N61° 11' 05.5" W130° 30' 10.0 / Good | RH 2 / Good RH 3 / Satisf. | CH2 / Good CH3 / Satisf. CH4 / Poor | 1080:0:0:8:800:200C:417A / Good | CH3/Satisf. : CH2/Good | 17:23:36:49.216 |
|  |  |  |  | 1001:1:0:0:345:8:417B:200C / Good | CH2/Good : CH3/Satisf, | 17:23:36:51.155 |
|  |  |  |  | 1001:1:0:345:80:17B:200C:F / Poor | CH3/Good |  |
|  |  |  |  | 380:10:4:AC20:8:18:0:105A / Satisf. | CH2/Satisf. |  |
|  |  |  |  | ... | ... |  |
| CH2 | ... |  |  | 100:41:345:0:A345:8:417B:27 1001:1:0:345:80:17B:200C:F | CH2: CH4 CH2: CH5 CH1: CH2 | 17:23:36:50.195 17:23:36:49.978 17:23:36:51.154 |
| CH3 | ... |  |  | ... | ... |  |

Figure 5

Global Status Table 500

| Regional Head ID | GPS Coordinate / Timestamp | Networking Status | Neighboring RH Status | | | Associated CHs | | Neighboring CHs / BLQI |
|---|---|---|---|---|---|---|---|---|
| | | | RH ID | BLQI | ISSUES | ID / BLQI | Leaf Nodes | |
| RH 1 | N61° 11' 05.5"  W130° 30' 10.3 /  17:23:36:49.831 | Good BLQI  Low congestion  Low latency | RH2 | Good | None | CH1 / Good | 1080:1:0:1:12:800:1:12  1080:1:0:1:12:800:1:14  1080:1:0:1:12:800:1:21 | CH13 / Good  CH15 / Poor  CH19 / Good |
| | | | RH3 | Satisf. | Moderate congestion | | | |
| | | | RH4 | Good | Latency increasing | CH2 / Good | 1001:1:0:0:145:20:9:42  1001:1:0:0:145:20:9:51 | ... |
| | | | ... | | | ... | ... | |
| RH 2 | N60° 12' 15.5"  W123° 34' 1.10 /  17:23:36:48.916 | Satisfactory BLQI  Congestion building up | RH1 | Good | None | CH13 / Good | 1078:1:0:35:76:0:0:22  1078:1:0:35:76:0:0:31 | ... |
| | | | RH3 | Good | Congested | | | |
| | | | RH5 | Poor | Node | CH14 / Good | 901:1:0:3:241:8:1:41  901:1:0:3:241:8:1:47 | |
| | | | ... | | | ... | ... | |
| ... | ... | ... | ... | | | | | ... |

DYNAMIC MANAGEMENT OF WIRELESS NETWORK TOPOLOGY WITH DIVERSE TRAFFIC FLOWS

This invention was made with U.S. Government support under Contract Nos. N66001-09-M-1005 and N66001-10-C-5203 awarded by the U.S. Navy. The U.S. Government has certain rights to this invention.

TECHNICAL FIELD

The present invention generally relates to topology management in wireless communications networks. More particularly, the invention relates to topology management in ad hoc dynamic environments comprising highly mobile nodes employing different types of radios and unbalanced dynamic data traffic distribution among different traffic types and priorities.

BACKGROUND

Network topology determines the availability and characteristics of the "connection" between any two nodes of the network. A "connection" is defined by the number of consecutive links forming the connection and the available transmission capacities of those links. These characteristics determine the data transmission reliability and delay between the "connected" network nodes.

For a network of fixed nodes, the topology is essentially static, being determined by the physical connections between the nodes. For a network with wireless mobile nodes, however, the topology is dynamic. In such ad hoc mobile networks, the topologies must be continuously managed in a self-forming manner by dynamically selecting from among multiple possible topology choices.

Current wireless network topology management technology employs network planning tools of the kind used with cellular communications networks. The utility of such planning tools, however, is limited to infrastructure networks, i.e. networks that include base stations operating with a single (generally omni-directional) type of radio. The ad hoc network, in contrast, is an infrastructure-less network in which the network elements (nodes) move around freely and the topology and networking conditions change continuously. Consequently, the network management tools designed for the reasonably static topologies and network conditions of the infrastructure networks are unsuited for application to the ad hoc mobile network dynamic environments.

Topology management in ad hoc dynamic environments is challenging for the following reasons: (1) the topology is highly dynamic and continuously changing due to the high mobility of the nodes; (2) the mobile nodes (platforms) are greatly varied, i.e. heterogeneous in nature, employing different types of radios with differing capabilities; and (3) the traffic is unbalanced with dynamically varying traffic distributed among different traffic types and priorities.

Disaster response to large-scale catastrophes, requiring the implementation of an information network to support the delivery of effective rescue services over a large area, presents a good example of an ad hoc dynamic environment that could benefit from the present invention. Such a network could include different types of land, sea, and/or air vehicles employing a random mix of commercially available wireless technologies, including such varied ones as Wi-Fi, Bluetooth, and UMTS-TDD Ad Hoc, among others. As such ad hoc communication devices abound, they come together in unplanned topologies, and when the networks become dense, as, for example, in an urban downtown, congestion and latency grow rapidly. A topology management system is required to dynamically set-up and manage such networks.

Another area that could benefit from the present invention is the US Department of Defense's (DoD's) pursuit of a comprehensive network-centric transformation of its forces. Initiatives such as the Navy FORCEnet and programs such as the Army Warfighter Information Network—Tactical (WIN-T) are central to this transformation. Such DoD efforts are predicated on the dynamic networking of radios with directional or omnidirectional antennas on a variety of platforms operating in a dynamic and ad hoc manner, and delivering over this network a variety of services with varying Qualities of Service (QoS) and multiple levels of security.

A method for managing ad hoc networks with directional antennas was disclosed in U.S. Pat. No. 7,830,820 B2, "Method and Apparatus for Directional Networking Topology Management," issued to Duke et al. A number of systems for managing antenna connection parameters in order to control the topology have also been disclosed (See, e.g. U.S. Pat. No. 6,990,080 B2, "Distributed Topology Control for Wireless Multi-hot Sensor Networks," Bahl et al.; US Patent Application No. US 2007/0081556 A1, "Antenna Management System," Evans et al.; and US Patent Application No. US 2007/0195746 A1, "Topology Management, Power Control and Cross-layer Design for Wireless Mobile Ad Hoc Networks with Directional Antennas," Ryu et al.) All these inventions, however, have focused on forming and managing antenna connectivity in the neighborhood of a node, and the topologies they form have been based on neighborhood connection considerations that fail to take into account the network-wide traffic loads and patterns. These are serious limitations, since such topology formations are ill-suited to supporting ad hoc networks with dynamically changing network traffic loads and patterns.

Topology management for establishing connectivity on the basis of the local traffic load has been disclosed in U.S. Pat. No. 7,855,997 B2, "Long Range Scheduling for Directional Antenna MANET Networks," issued to Adams et al. These traffic scheduling and connectivity considerations, however, are also, as above, limited to the immediate neighborhood of the node, failing to take into account the network-wide traffic loads and patterns. Furthermore, packet priorities are not factored into scheduling the forwarding of the data packets. These constitute serious limitations since traffic load increases elsewhere in the network can potentially impact the delivery of the local packet, for example, where a congested area is en-route the packet's transit path. Also, where the topology management fails to treat high priority packets preferentially, their delivery reliability and latency performance suffer.

Methods that implement topological connectivity over the entire network have also been disclosed. (See, e.g., U.S. Pat. No. 6,791,949 B1, "Network Protocol for Wireless Ad Hoc Networks," Ryu et al.; U.S. Pat. No. 7,606,171 B1, "Skeletal Node Rules for Connected Dominating Set in Ad-Hoc Networks," Young et al.; US Patent Application No. 2011/0090787 A1, "Spanning Tree Flooding Backbone Systems and Methods for Link State Routed Networks," Smith et al.) As above, however, these methods too do not take into account the network-wide traffic loads and patterns and data packet priorities.

Preferential scheduling of higher priority packets at a network node has been disclosed in U.S. Pat. No. 7,417,999 B1, "Priority Propagation in a Multi-level Scheduling Hierarchy," issued to Charny et al. But this patent only addresses priority-based transmission of data packets at a single node, and not across the network. This approach too, as above, fails to take into account the specifics of the network topology in formulating the forwarding strategy, and the packet forwarding strategy implemented may not be supportable by the prevailing topology.

There exists a need for a topology management system and method that manages network-wide topology and influences data packet forwarding based on the traffic loads, patterns, and priorities across the network. This requires a topology management system that dynamically tracks the network traffic characteristics and forms and manages the topologies accordingly. The system and method disclosed and claimed herein provide an effective means to dynamically manage topology and network performance in such scenarios.

SUMMARY OF THE INVENTION

A topology management system and method for optimizing the performance of ad hoc dynamic wireless communication networks carrying diverse traffic flows with different quality of service requirements and priorities is disclosed. The topology management invention herein utilizes antenna directionality, priority-aware load balancing, and traffic siphoning to optimize the overall network performance.

The instant topology management invention uses a hierarchical approach for managing the network topology. This multi-level approach to topology management allows increased scalability and greater distribution. Scalability and distributed management features are essential for highly dynamic networking environments since topology adjustments and optimizations must be executed rapidly. The three levels are designated as leaf nodes (bottom level, 1), cluster head nodes (middle level, 2), and regional head nodes (top level, 3). Each level is managed via its individual database, namely, Neighborhood Status Table (NST) for level 1, Cluster Status Table (CST) for level 2, and Global Status Table (GST) for level 3.

The leaf nodes generate periodic beacon messages, which provide detailed information about their communication link quality. The beacon messages from the leaf nodes are gathered by the cluster head node to create a Neighborhood Status Table (NST), which identifies the members of a given group, for example, an air or land ambulatory rescue group, forming a cluster. The NSTs from different clusters are collected by the regional head node to create a Cluster Status Table (CST) that describes the regional topology (identifying, for example, the clusters involved in the rescue operation, e.g., air and/or land ambulatory rescue cluster, field surgical cluster, first aid EMT cluster, firefighting and hazardous waste disposal cluster, etc.). A number of such CSTs are grouped by a central command authority into a Global Status Table (GST), which provides a broad view of the network topology.

The present invention monitors the performance of such distributed networks by making edge-to-edge probe based measurements of low complexity executed at the edge nodes, i.e., at the regional heads and cluster-heads. Edge nodes are typically high capability nodes, such as those having internetworking capabilities and high capacity communication links. The edge-to-edge probe based measurements involve transmission of time-stamped probe packet trains over the target paths. A probe packet train is composed of scores of fixed size user datagram packets transported at a constant bit rate (UDP/CBR). Arrivals of the time-stamped probe packets are monitored at the ingress edge nodes, and network performance metrics, such as end-to-end delay, jitter, packet loss rate, and throughput etc., determined. These measurements are used to select the best topology optimization algorithm for optimal network performance.

Priority-aware load balancing is at the core of achieving performance optimization in the instant topology management invention. In one embodiment, it implements two backbone tree traffic transportation pathways, a primary backbone tree and a secondary backbone tree. The primary backbone tree is used for high priority traffic, and the secondary backbone tree is used for lower priority traffic. Although two backbone trees are discussed in detail herein, a greater number of backbone trees can be similarly used for even more discriminatory priority load balancing, however, at the cost of increased complexity. Such multiple-tree implementations are within the scope of the present invention. The multiple-tree architecture enables the topology management invention to protect the integrity of high priority flows, and meeting their service guarantees even under extremely congested network traffic conditions.

The backbone tree function is enabled via the following steps: (1) Backbone Selection, for selecting the backbone tree nodes, (2) Backbone Connection, for completing the backbone tree connections so that all nodes have access to the backbone tree, and (3) Backbone Maintenance, for maintaining backbone tree optimality and connectivity in the presence of node mobility. These steps are used for constructing and maintaining both the primary backbone tree and the secondary backbone tree. Once constructed, the primary and secondary backbone trees are dynamically maintained and their performances assured despite any disruptions caused by effects such as node mobility, network failure, or insertion of new network nodes.

The topology management invention herein uses traffic siphoning to further protect the high-priority flows, when needed, such as when part of the network is overloaded from excessive traffic congestion or becomes temporarily unavailable due to network failure. In such cases, traffic siphoning redirects traffic away from the excessively congested or problematic area(s) and delivers the information to its intended destination via indirect paths. For data transport, these indirect siphoning paths exploit the unutilized part of the network, away from the excessively congested or temporarily unavailable backbone tree paths.

Briefly, the present invention comprises a flexible high-performance layered management split data architecture that sustains multiple simultaneous directional antenna links and supports traffic with different priorities and characteristics. The invention has the following characteristics:

Management and Routing Independence: The network management infrastructure is independent of the data routing infrastructure, thus enabling utilization of multiple simultaneous directional link capabilities and mitigating single points of failure. For instance, the cluster head node with which a leaf node associates for management purposes may be different from the node with which it associates for forwarding high priority data, which in turn may be different from the node with which it associates for forwarding low priority data.

Layered Management: Network management occurs through a hierarchical approach in which the nodes are organized into multiple layers of hierarchy. A three-layered hierarchical management structure is disclosed herein; however, additional management layers may be added if desired and are within the scope of the instant invention. The signaling messages for network management traverse across this hierarchical structure.

Split Data: The traffic is split onto different logical backbone tree paths according to the traffic flow priorities. Higher priority traffic flows are forwarded along one logical backbone tree path whereas lower priority traffic flows are forwarded along a different independent logical backbone tree path.

Other embodiments apparent to one of ordinary skill in the art are within the scope of the present invention. The drawings, however, are primarily for illustration and must not be construed as limiting. The scope of the invention is to be limited only by the claims, and not by the drawings or description herein.

BRIEF DESCRIPTION OF THE DRAWINGS

The objects, features, and advantages of the present invention are more fully understood when considered in conjunction with the following accompanying drawings:

FIG. 3 shows an example Neighborhood Status Table;

FIG. 4 shows an example Cluster Status Table;

FIG. 5 shows an example Global Status Table;

DETAILED DESCRIPTION OF THE INVENTION

Topology management starts from topology discovery. Although it is possible that the initial network topology information may be available a priori, such as from initial planning, the instant topology management tool is nevertheless able to quickly discover an accurate network topology through network monitoring and analysis. This ability to rapidly discover the network topology is particularly important where, as here, the wireless communication network topologies change dynamically and constantly due to node mobility.

Figure 1:
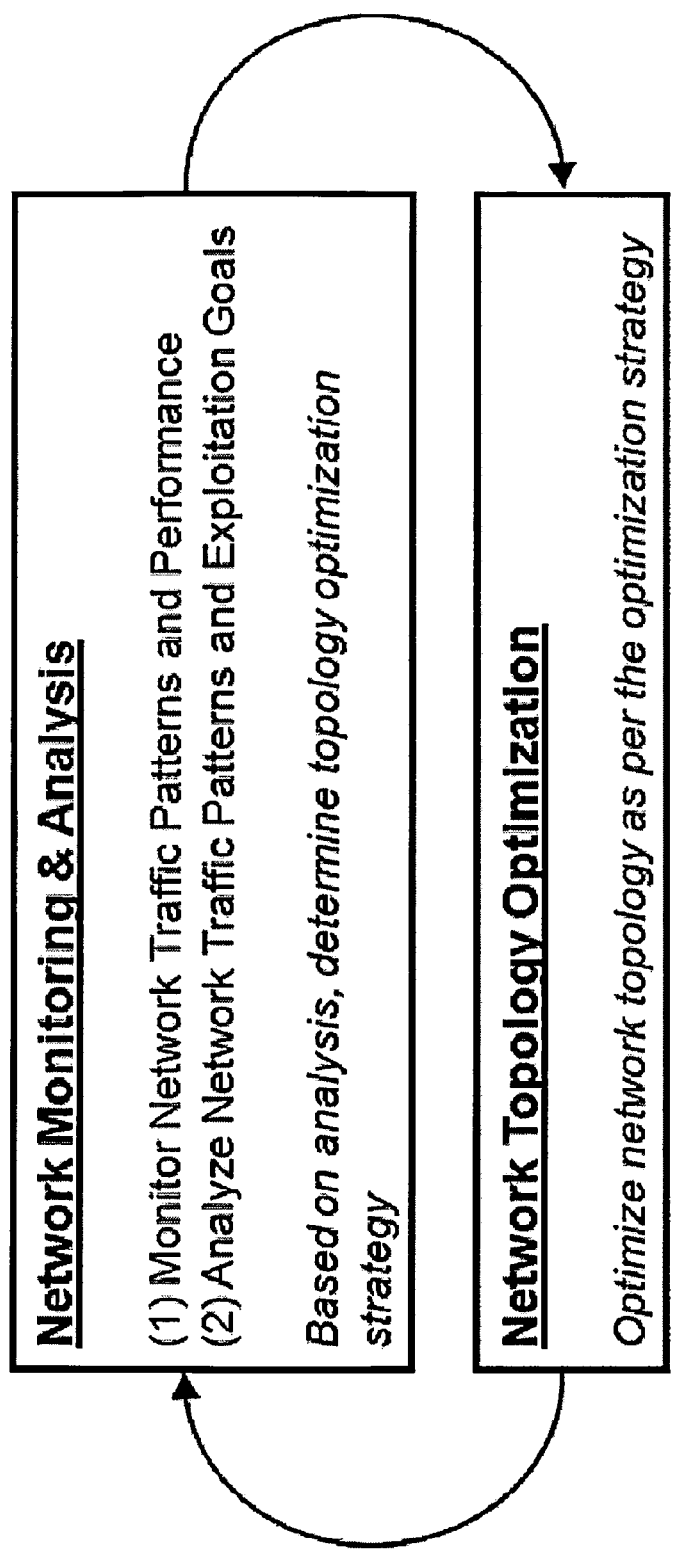
FIG. 1 presents an overview of the instant invention's topology management methodology.

FIG. 1 illustrates the instant invention's topology management methodology. Based on the topology information, the system herein continuously monitors and analyzes the network performance. The monitored characteristics and measured performance are analyzed to select and execute the most appropriate topology optimization. Since the envisioned ad hoc communication network is highly dynamic, the network topology is continuously monitored, analyzed, and optimized to maintain optimal performance. These processes iterate through the lifetime of the ad hoc dynamic wireless network.

Figure 2:
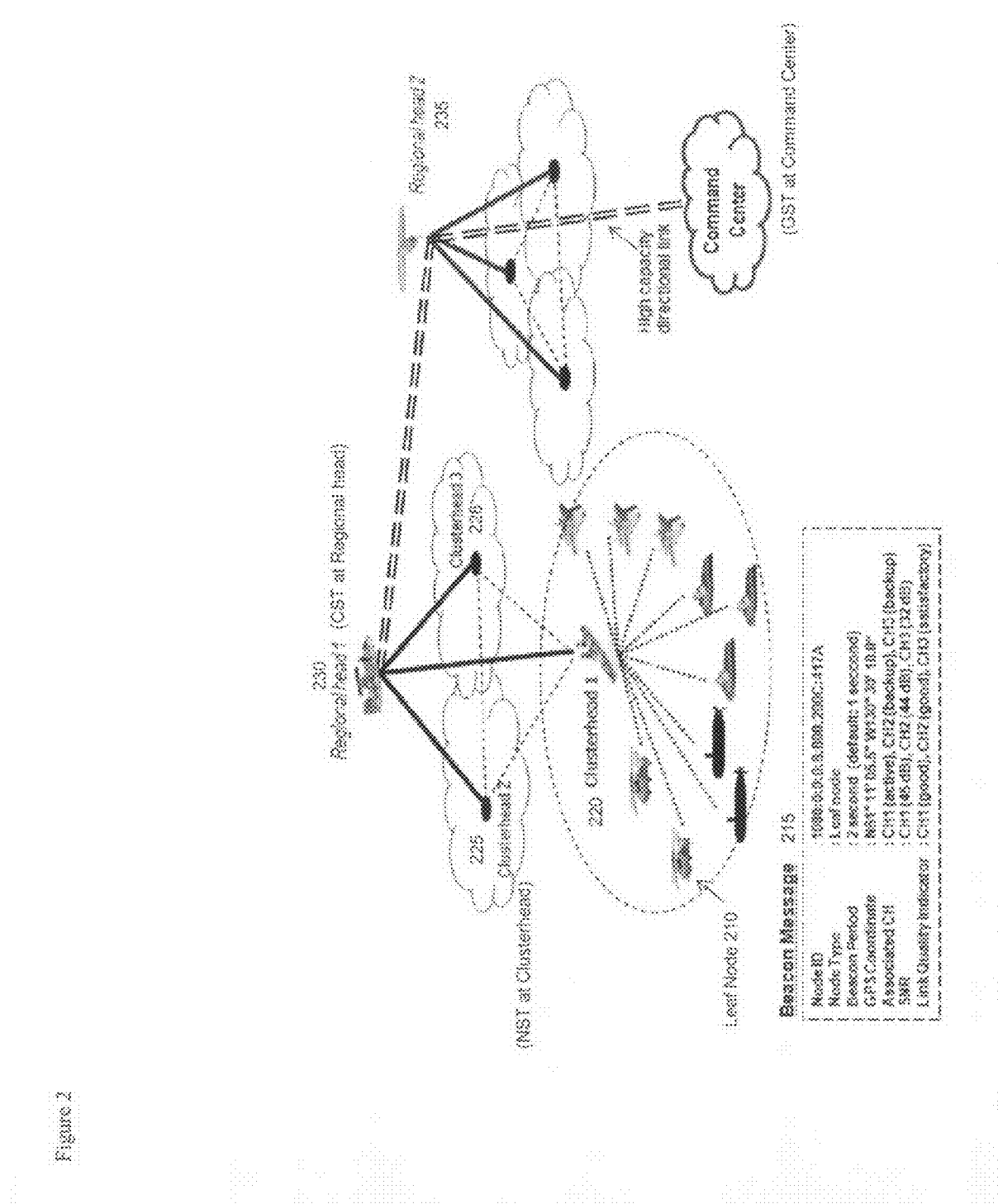
FIG. 2 depicts an exemplary three-tier hierarchical approach for topology management.

A hierarchical approach that distributes and manages the network at three logical management levels is used (FIG. 2). This multi-level approach makes topology management scalable and better distributed. Scalability and distributed management are essential for highly dynamic networking environments because topology adjustments and optimizations have to be executed rapidly. The three management levels employed herein are designated respectively as leaf nodes (bottom level 1) 210, cluster head nodes (middle level 2) 220, and regional head nodes (top level 3) 230. Each level is managed via its characteristic database, namely, Neighborhood Status Table (NST) at level 1 (See, e.g., FIGS. 2 and 3), Cluster Status Table (CST) at level 2 (See, e.g., FIGS. 2 and 4), and Global Status Table (GST) at level 3 (See, e.g., FIGS. 2 and 5).

A leaf node 210 is typically a member of a cluster. A cluster-head node manages a group of leaf nodes, e.g. 210, for topology and link quality management. The cluster head node, e.g. 220, is generally a high capability mobile node, such as one equipped with greater computational power, more networking functionalities, and larger bandwidth than the leaf nodes. All traffic (e.g., data, signaling, etc.), e.g. 215, flows to and from a leaf node through a cluster head node. Thus, the cluster head node is typically involved in performing higher level functions, such as packet forwarding, signaling, topology control, and link quality monitoring.

In general, a leaf node, e.g. 210 may have multiple cluster head nodes in its radio range. A leaf node always binds itself to a nearby primary cluster head node (i.e., current binding cluster head node), with secondary cluster head node, tertiary cluster head node, and so forth, available as back-ups. The preferred cluster head node binding is generally mandated by the mission plan but a leaf node always endeavors to bind itself to a best conditioned cluster head node where the term 'best condition' always implies bidirectional communication between the leaf node and the cluster head node.

Cluster head nodes, e.g. 220, are either connected to regional head nodes, e.g. 230, or other (peer) cluster head nodes, e.g. 225, through high capacity directional antenna links. As mentioned above, cluster head nodes are higher capability nodes generally equipped with multiple communication technologies. Depending on the type and functional capabilities of a cluster head node, it may need to always communicate via a regional head node that typically will have even greater networking capability or a sufficiently or fully integrated networking capability. The cluster head node, e.g. 220, is intimately involved in topology management, topology optimization, and network performance monitoring.

A regional head node, e.g. 230, is typically connected to other (peer) regional head nodes, e.g. 235, thus providing extensive traffic forwarding capability through high bandwidth communication links. A regional head node could, therefore, either be linked to multiple cluster head nodes, e.g. 220, 225, and 228, or act purely as a relay, i.e. a forwarding or routing unit. An example of a regional head node is a wide body airplane that provides highly advanced functionalities such as waveform translations for multiple waveform types.

The leaf nodes, e.g. 210, within the cluster generate periodic beacon messages, e.g. 215, in which are embedded details about the beacon transmitter and its communication links. These beacon messages are collected in a Neighborhood Status Table (NST) 300 created by the cluster head node, e.g. 220, that organizes and manages the leaf nodes. The NST allows the cluster head node 220 to accurately maintain and manage the leaf nodes in its neighborhood.

FIG. 3 presents an example snapshot of a NST 300 residing at a cluster head node. The example NST lists node Identifiers (node IDs in the IPv6 format), node type, Signal-to-Noise (SNR) readings, Bidirectional Link Quality Indication (BLQI), GPS coordinates of leaf nodes, Affinity (a measure of the duration of the connectivity, i.e. the stability of the communication link), associated cluster head nodes, last timestamp, beacon message periodicity, number of missed beacon messages, and so forth. The SNR readings include downlink SNR and uplink SNR values. The SNR values represent weighted moving average values. The term "downlink" refers to the communication link from the cluster head node 220 (in FIG. 2) to the leaf node, e.g. 210, whereas the uplink indicates the communication link from the leaf node, e.g. 210, to the cluster head node, e.g. 220. BLQI describes the bidirectional link quality.

If both downlink SNR and uplink SNR readings are above their predefined threshold values, the BLQI will indicate a "good" reading. Otherwise, BLQI will indicate "poor," as illustrated in FIG. 3. The NSTs from different clusters are merged by a regional head node, e.g. 230, to create a Cluster Status Table (CST) that describes the regional topology. Typically, the CST resides at a regional head node, e.g. 230, and provides comprehensive detail about its regional network. FIG. 4 illustrates an example of a CST 400 that lists cluster-head node IDs; GPS coordinates, connection quality of the cluster head node (BLQI); associated regional head nodes and the qualities of their connections to the cluster head node (BLQI); neighboring cluster head nodes and the qualities of their connections to the cluster head node (BLQI); associated leaf node IDs and the qualities of their connections to the cluster head node (BLQI); primary and back-up cluster-head nodes for each leaf node; last update timestamps, and so forth.

The CST of FIG. 4 shows a leaf node with an IPv6 address 1001:1:0:345:80:17B:200C:F, which has CH1 as its primary cluster head node and CH3 as its secondary cluster head node. The CST reveals that the connection quality between the leaf node and CH1 has deteriorated to 'poor.' In addition, it also shows that the connection quality between the leaf node and its backup cluster head node CH3 is in good condition. This condition results in CH1 delegating the ongoing communications with the leaf node to CH3. The cluster head node change is reflected in the subsequent beacon messages, and the associated NST 300, CST 400, and GST 500 are updated accordingly. This example also shows that associating a leaf node with multiple cluster head nodes substantially enhances network performance, network reliability, and network survivability.

The CSTs from regional head nodes are, in turn, combined by the command center to create a Global Status Table (GST) 500, providing a comprehensive view of the network topology (See, e.g., FIG. 5). The example GST 500 lists regional head node (RH) IDs, regional head node GPS coordinates and timestamps, regional head node networking status, neighboring regional head node status, associated cluster head nodes (CHs) and their status, and neighboring CHs that are not associated with RHs (but within the radio range) including the qualities of the CH connections. Once the network topology is identified, the network performance is monitored and assessed using local link quality monitoring and edge-to-edge probe based measurements.

The network's communication links are monitored continuously to verify link quality and link connectivity of the leaf nodes within the clusters. The link quality monitoring is performed by the exchange of beacon messages, e.g. 215 (FIG. 2), between each leaf node, e.g. 210, and its primary cluster head node, e.g. 220. The beacon messages, e.g. 215, are encoded with detailed information on the transmitting leaf node and it includes (but is not limited to) GPS coordinate, node type, beacon periodicity, associated CHs and their SNR measurements, and Link Quality Indicator. The cluster-wide link quality information is maintained in the Neighborhood Status Table (NST). e.g. 300, which serves as a current resource for cluster link quality and topology information.

The edge-to-edge probe based measurement is a low complexity distributed network performance measurement procedure that is executed at the edge nodes (certain regional head nodes and cluster head nodes). The more capable nodes within the respective management levels serve as edge nodes. The edge nodes typically have internet working capability and high capacity communication links. The edge-to-edge probe based measurement procedure involves the transmission of time-stamped probe packet trains over the target data path. A probe packet train is composed of scores of fixed size user datagram packets transported at a constant bit rate (CBR/UDP). At the ingress edge nodes, the arrivals of the time-stamped probe packets are monitored and network performance metrics, such as end-to-end delay, jitter, packet loss rate, throughput, etc., determined. These measurements are analyzed to select the best optimization algorithm for optimal network performance. For example, if "delay" is detected, the network is optimized to improve delay. Or, if frequent "packet loss" is detected, the network is optimized to improve reliability, and so forth.

Figure 6:
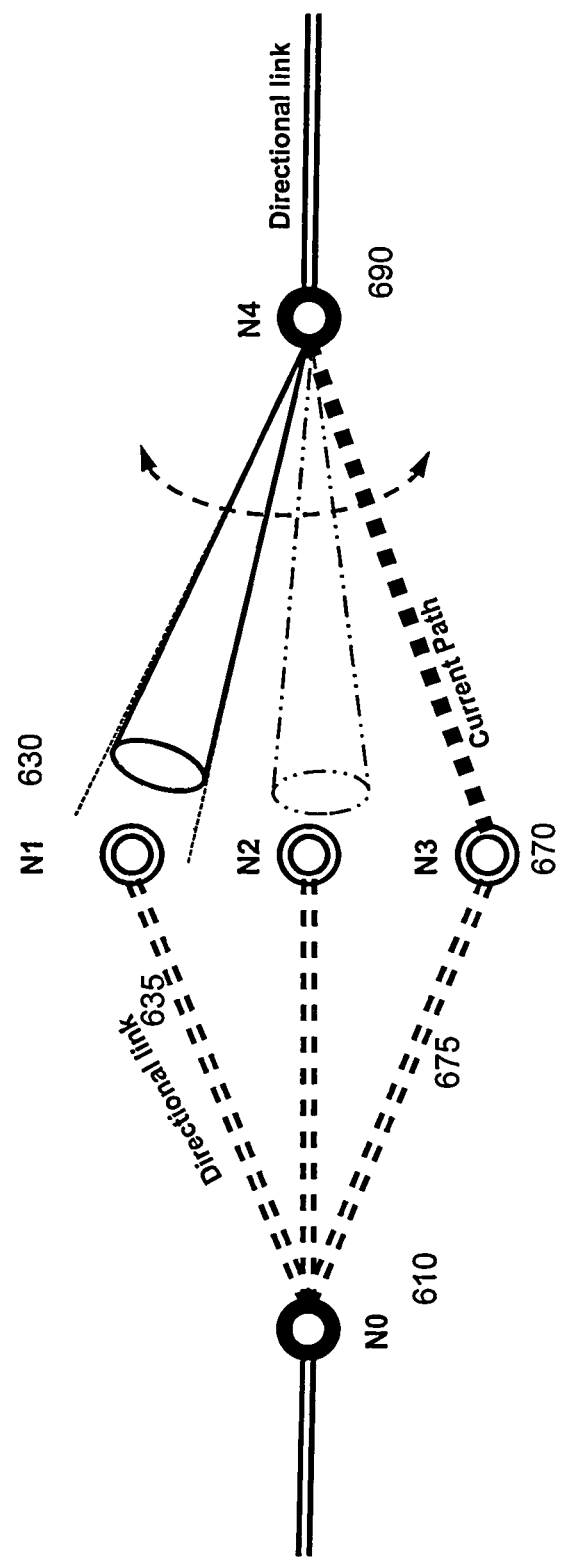
FIG. 6 shows use of antenna directionality in topology optimization.

To enhance the overall network performance, the instant invention exploits antenna directionality, priority-aware load balancing, and traffic siphoning. For example, in FIG. 6, the instant invention identifies through network monitoring that N3 670 is no longer the optimal relay node for the N0-N4 (610-690) node pair. It then determines based on the network status information (e.g. at NST 300, CST 400, and GST 500) that N1 630 is the new optimal backbone node (e.g., regional head node or cluster head node) for carrying the traffic, and changes the N0 610 antenna directivity from N3 675 to N1 635.

Figure 7:
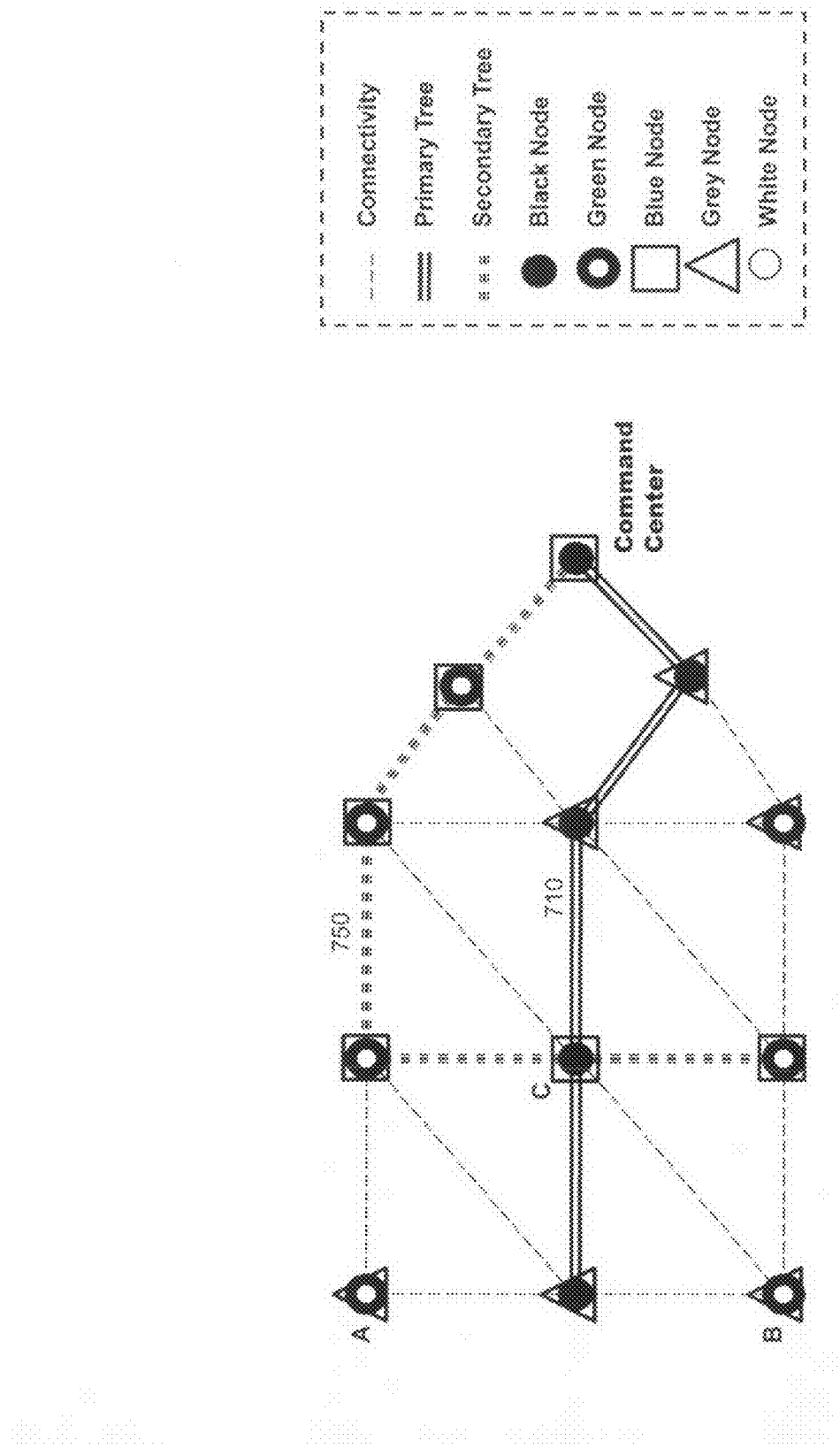
FIG. 7 illustrates an example of a priority-aware two backbone tree network.

Priority-aware traffic load balancing is central to achieving performance optimization in the instant invention. As shown in FIG. 7, the preferred scheme implements two backbone trees, a primary backbone tree 710 and a secondary backbone tree 750. The primary backbone tree 710 is used for the higher priority traffic, and the secondary backbone tree 750 is used for lower priority traffic. As an example, node A, with a high priority Intelligence, Surveillance, Reconnaissance (ISR) video feed that has to be delivered to the command center 790, would use the primary backbone tree 710 for transporting the traffic. In contrast, node B, with low priority sensor data, would utilize the secondary backbone tree 750. Where the two backbone trees intersect, such as at node C, a strict priority-based preemption is used to maintain the integrity of the traffic flows along the primary backbone tree. This two-tree architecture protects the integrity of high priority flows and meets their service guarantees even under extremely congested conditions. Although a two-tree architecture is discussed herein, it will be apparent to one of ordinary skill in the art that tree architectures of greater plurality are possible with some additional complexity; such architectures based on more than two backbone trees are within the spirit and scope of the present invention.

In the dynamic ad hoc network scenario, the topology of the primary backbone tree, e.g. 710, is expected to vary constantly throughout the lifetime of the network. Consequently, in order to maintain sustained optimal networking performance, the optimal topology of the primary backbone tree 710 is continuously reevaluated and reconfigured as needed. Also, the primary backbone tree 710 is preferably provisioned to keep its asset utilization under a certain level to accommodate any sudden influx of high priority flows. This helps to maintain the integrity of the traffic flows along the primary backbone tree, e.g. 710, without experiencing unacceptable congestion. The utilization level of the primary backbone tree, e.g. 710, is a system parameter that can be established by the mission planners or the command center.

The secondary backbone tree 750 is used to transport low priority and delay tolerant traffic. A main purpose of the secondary backbone tree 750 is to protect the integrity of the high priority flows along the primary backbone tree 710. The secondary backbone tree 750 keeps the low priority traffic away from the primary backbone tree 710, thereby preventing the low priority traffic from competing with high priority flows for network resources. To the extent possible, the secondary backbone tree 750 is constructed to avoid any overlap of its nodes with the primary backbone tree 710 nodes and help disperse the low priority network loads away from the primary backbone tree 710.

The threshold for establishing a high priority level is a system parameter that determines the right of the traffic to utilize the primary backbone tree, e.g. 710, for transport. Traffic flows with priority levels equal to or higher than the priority threshold are transported over the primary backbone tree. Those with priority levels lower than the priority threshold are transported over the secondary backbone tree, e.g. 750. The priority threshold is a variable value that, if desired, can be changed dynamically depending on the primary backbone tree's current utilization level.

When the primary backbone tree, e.g. 710, becomes crowded with high priority traffic flows, the priority threshold is raised to protect the higher priority traffic flows from being impacted. For example, while traffic flows with priority levels 3 and 4 (priority level 1 being the highest) may earlier have been transported over the primary backbone tree, after the priority threshold increase, only the higher priority flow (i.e., priority 3) may be allowed in the primary backbone tree, e.g. 710, forcing the priority 4 flow to be transported over the secondary backbone tree, e.g. 750.

Figure 8:
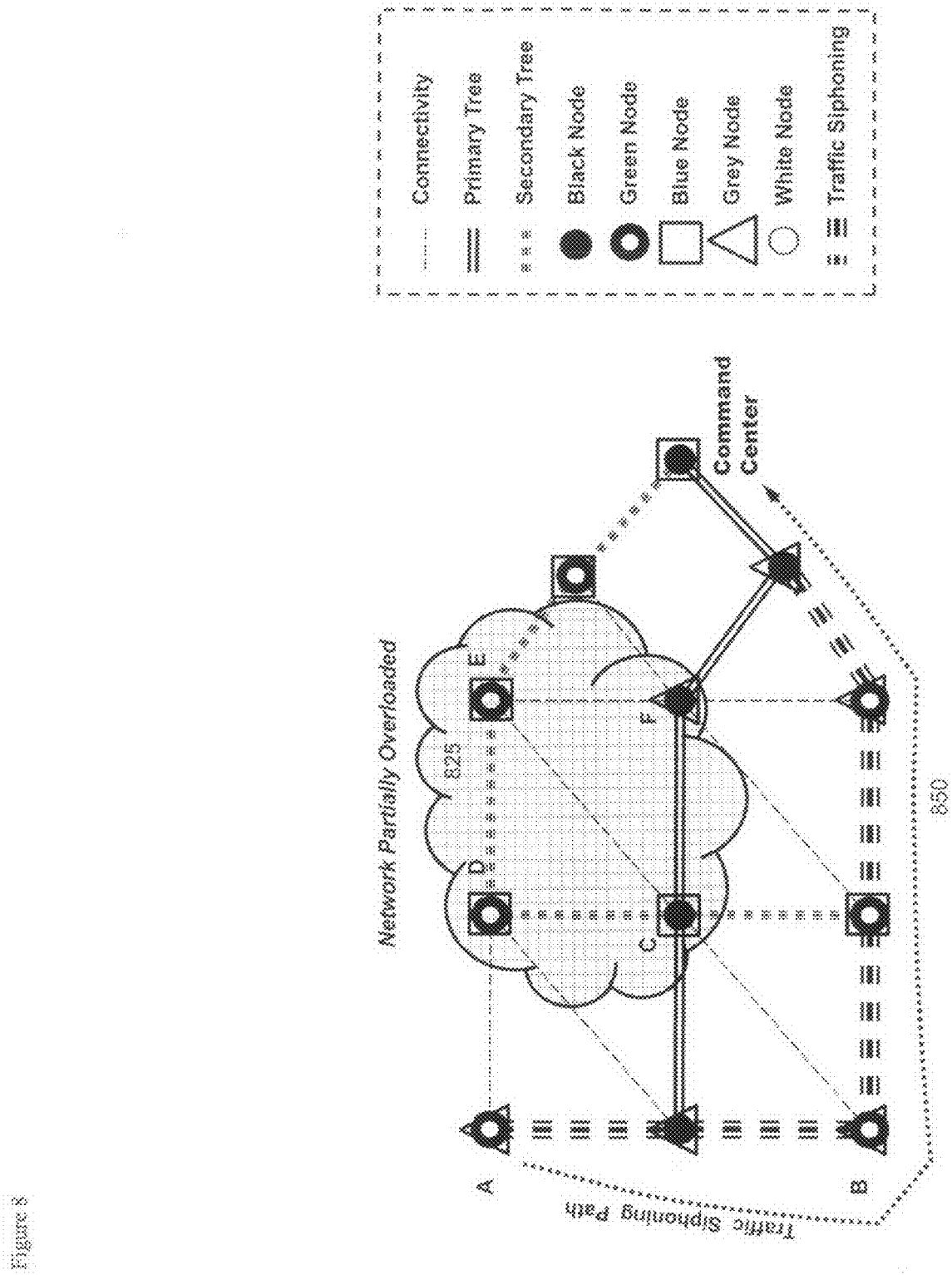
FIG. 8 shows the use of traffic siphoning for bypassing a congested portion of the network.

To further protect the high-priority flows, the instant topology management invention uses traffic siphoning (FIG. 8), when needed. Traffic siphoning 850 is employed when part of the network 825 is overloaded from excessive traffic or becomes temporarily unavailable due to reasons such as network failure. In such cases, traffic siphoning 850 directs traffic away from the excessively congested or problematic areas and delivers the information to its intended destination, e.g. the Command Center, via indirect paths. These indirect siphoning paths exploit the unutilized parts of the network for transport, away from the excessively congested or temporarily unavailable backbone tree paths. For instance, the traffic siphoning path shown in FIG. 8 is created at the outer edges of the network in order to circumvent the overloaded conditions at the backbone tree nodes C, D, E, and F. Traffic siphoning 850 results in creating redundant or extended backbone tree paths but, once they are no longer needed, subsequent topology optimization removes the unutilized redundancy.

Optimal dynamic network performance is achieved by employing the two backbone tree architecture, e.g. 710 and 750, which is dynamically configured and maintained to best suit the changing physical topology and traffic patterns. The primary backbone tree, e.g. 710, transports high priority traffic requiring highly assured networking performance, while the secondary backbone tree, e.g. 750, carries the low priority and delay tolerant flows, away from the primary backbone tree, e.g. 710. The tree construction is an approximation of the Minimum Connected Dominating Set (MCDS) in graph theory, where a subset of the connected graph forming the tree (i.e., MCDS nodes) can reach all non-MCDS nodes with a single hop. See, e.g., "Distributed Construction of Connected Dominating Set in Wireless Ad Hoc Networks", by P. J. Wan et al, Proceedings of IEEE Infocom, pp 1597-1604, volume 3, June 2002, New York, New York.

The ongoing construction and maintenance of the primary backbone tree and the secondary backbone tree entail the following steps: (1) Backbone Selection, which selects the backbone tree nodes; (2) Backbone Connection, which completes the backbone tree connections so that all the network nodes have one-hop access to the backbone tree nodes; and (3) Backbone Maintenance, which maintains backbone tree optimality and connectivity in the presence of node mobility. The primary backbone tree construction precedes the secondary backbone construction, which starts only after the primary backbone tree has been constructed. Where needed due to node mobility, the topologies of the two backbone trees are changed dynamically; however, although their shapes may change to accommodate the changing topologies, the trees remain connected and functional throughout the lifetime of the network. Once efficient primary and secondary backbone trees are constructed, they are effectively utilized to dynamically optimize network performance.

Primary Backbone Tree Construction:

A. Backbone Selection (FIGS. 9 and 10): In order to construct the primary backbone tree, the system must first select the backbone tree nodes from among the many candidates. High profile nodes (e.g. cluster head nodes and regional head nodes) are obvious candidates to serve as primary backbone tree nodes. In selecting the nodes for primary backbone tree construction, the node degree (i.e., number of 1-hop neighbors) for each node is used as a selection metric. Any node that lacks a backbone tree node as a 1-hop neighbor requests its "best neighbor" to become a backbone tree node (for it to have an access point for transporting its traffic via the backbone trees). The term "best neighbor" means the highest ranked node, and/or node with the best SNR, and/or node with the best data rate, and/or node with the highest degree of connectivity to adjacent neighbors, as required. At the completion of this backbone tree node selection process, each node in the network has either been selected as part of the backbone tree or has a 1-hop neighbor node that has been selected as one.

To further clarify the primary backbone tree construction process, an example is presented in FIG. 7, where the nodes are color labeled as either White, Green, or Black. A node is Black when it is part of the primary backbone tree, e.g. 710, Green when it is a 1-hop neighbor of a Black node, and White when it has no 1-hop Black node neighbor. (As shown in FIG. 7, the White nodes in the figures of this disclosure appear as small open circles, Black nodes as small dark circles, and Green nodes as black donuts consisting of a large black ring enclosing an open center.) In addition, a node is Black when it is providing access to the primary tree for at least one other 1-hop neighbor node. In other words, a Black node is an access point to the primary tree (i.e., Primary Access Point (PAP)) for other network nodes. The objective in the primary backbone tree construction is to designate all the nodes in the backbone tree network as either Black or Green. Based on this goal, the network selects the initial primary backbone tree nodes from the high capability cluster head and regional head nodes available.

Figure 9:
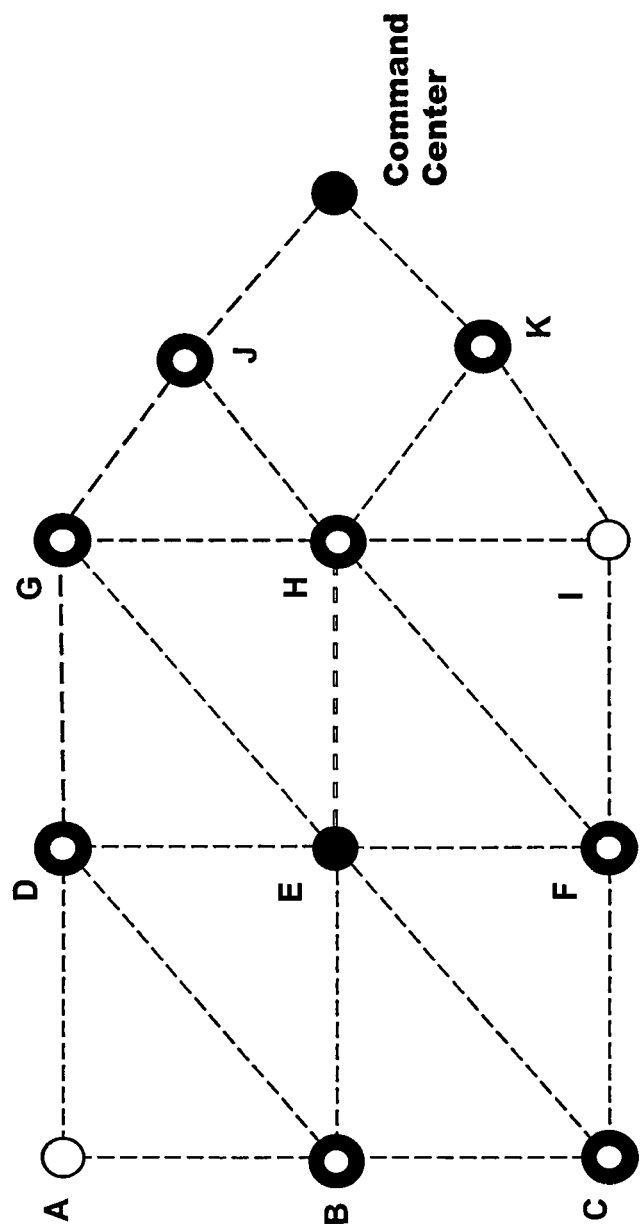
FIG. 9 illustrates the process for selecting the primary backbone tree nodes.

FIG. 9 illustrates, by way of example, the initial stages of the primary backbone tree node selection process. The Command Center is inherently part of the primary backbone tree and is labeled as Black, causing its 1-hop neighbor nodes (connected to it by dashed lines), J and K, to be Green. If node E is a high profile unit (i.e., an important unit), it too becomes part of the primary backbone tree and turns Black. Then, by definition, E's 1-hop neighbors (connected to E with dashed lines), B, C, D, F, G, and H, become Green. This leaves A and I as White. In order to accommodate these two remaining White nodes, nodes B and H turn Black, becoming a part of the primary backbone tree. This changes nodes A and I (which are 1-hop away respectively from B and H) into Green.

Figure 10:
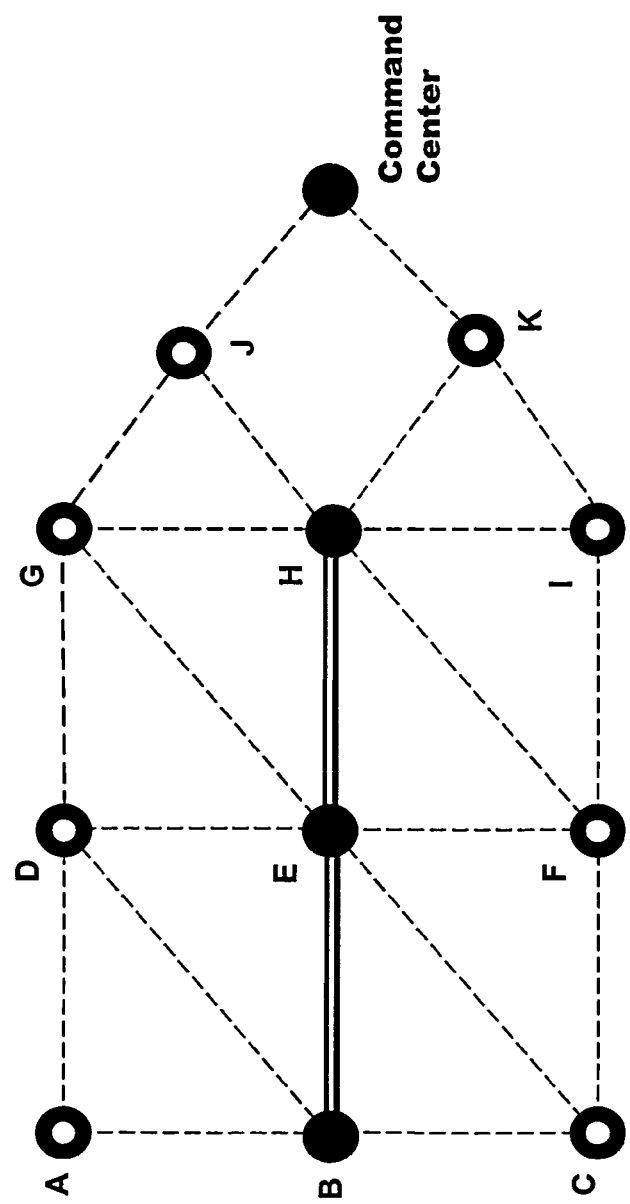
FIG. 10 represents completion of the primary backbone tree node selection process.

FIG. 10 illustrates the outcome of the example backbone selection process.

Figure 11:
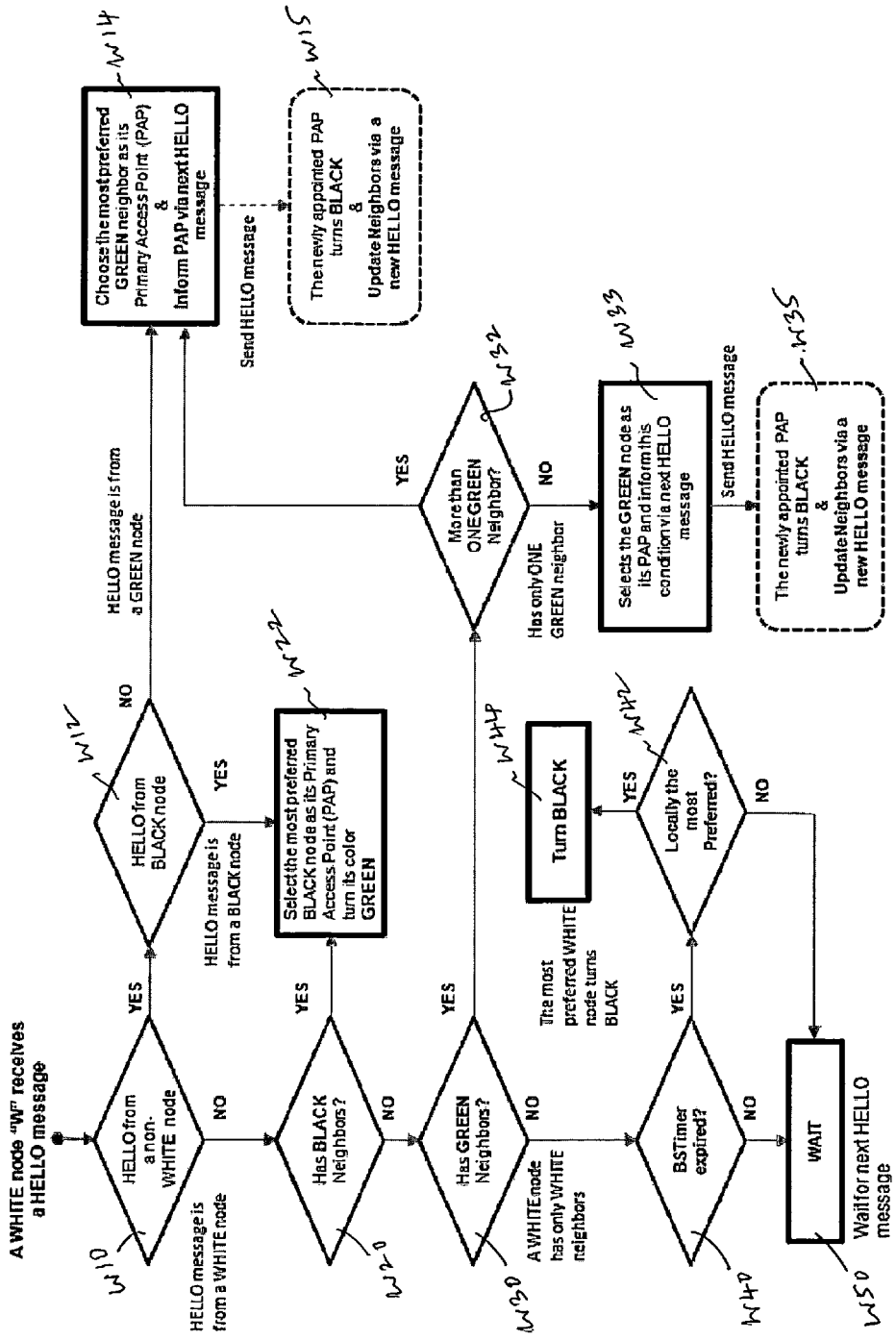
FIG. 11 presents an example node selection flowchart for a White node.
Figure 12:
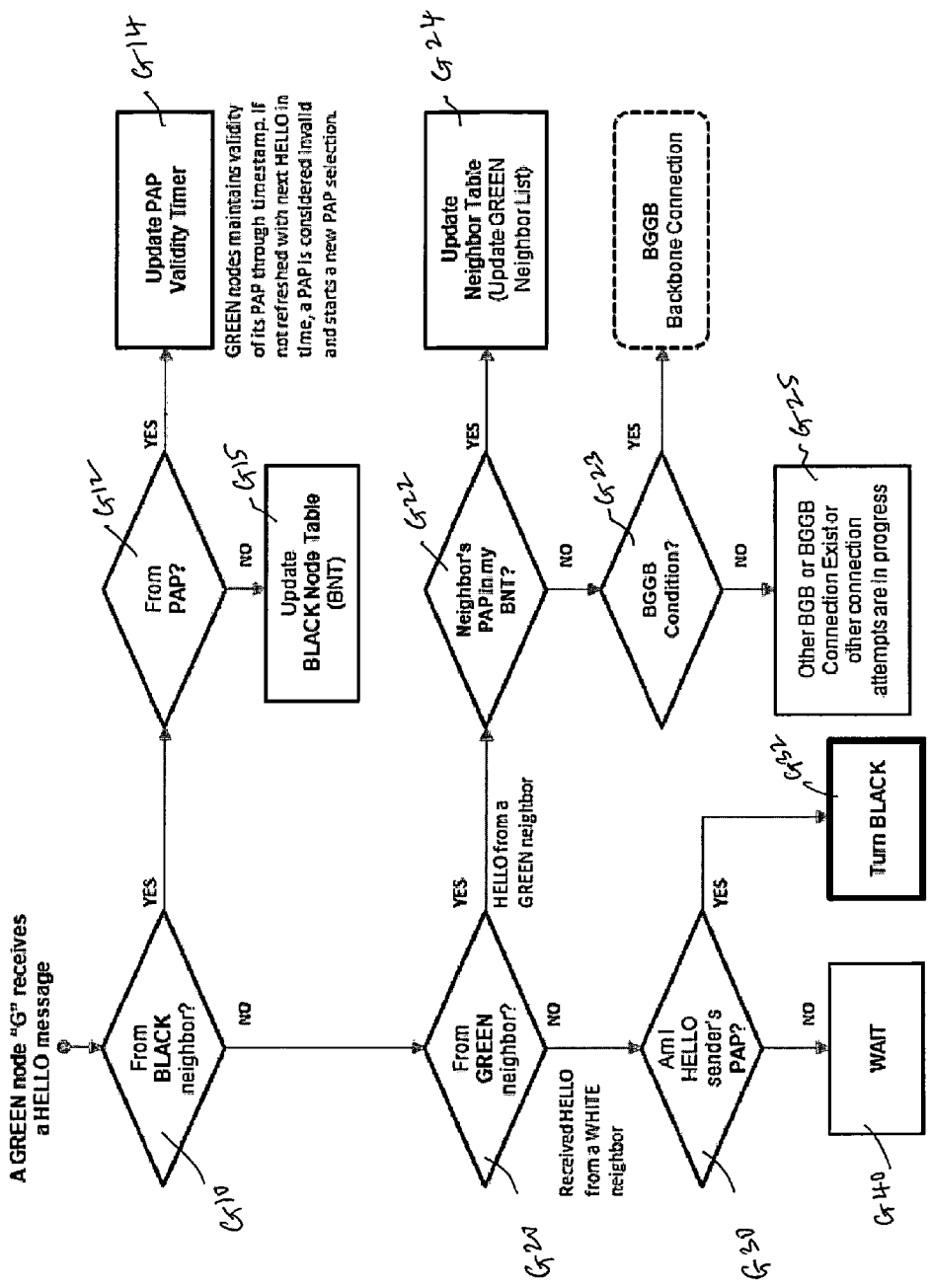
FIG. 12 presents an example node selection flowchart for a Green node.
Figure 13:
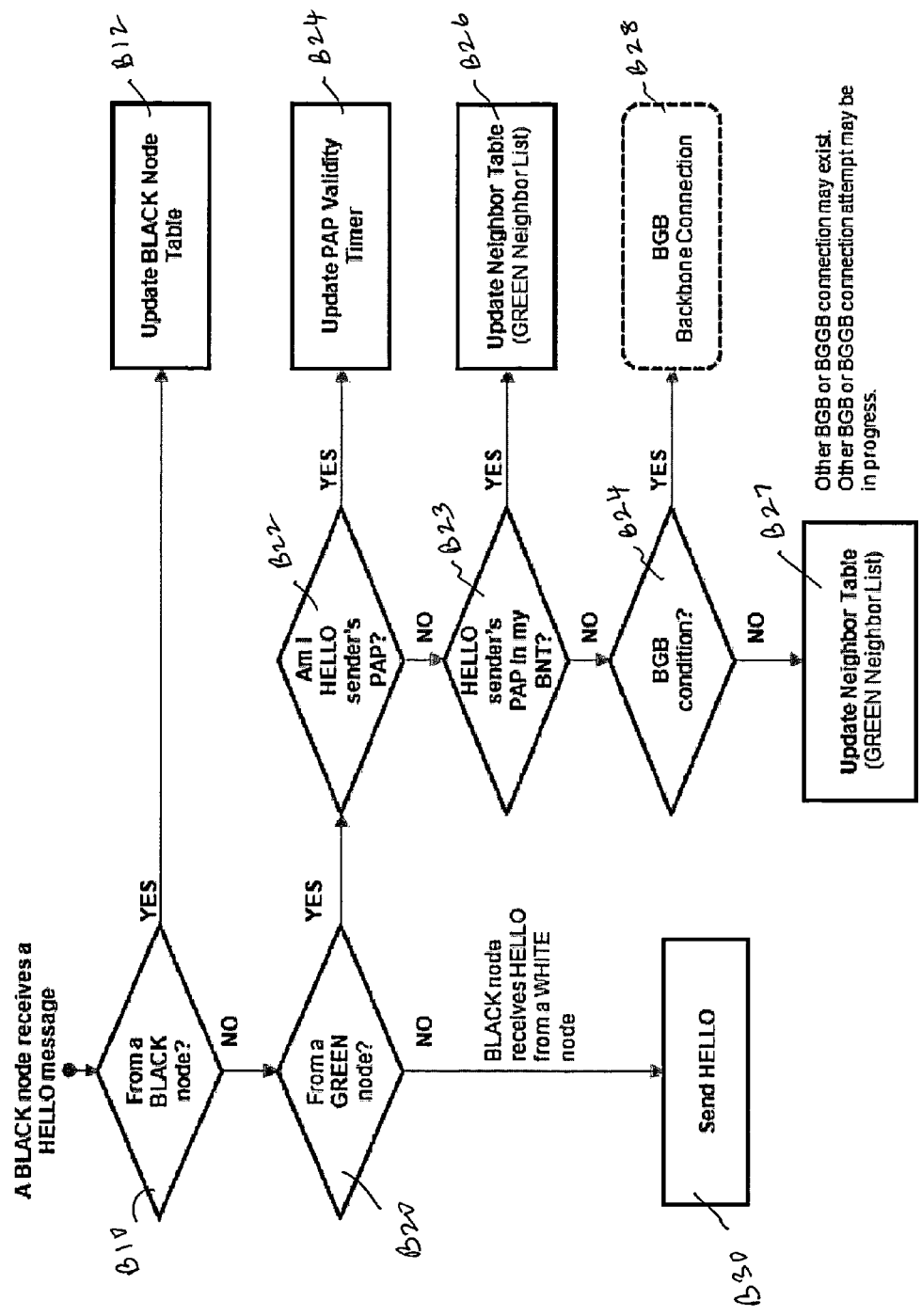
FIG. 13 presents an example node selection flowchart for a Black node.

The algorithms that facilitate the node selection process in one embodiment of the invention are schematically presented in FIGS. 11 through 13. While FIG. 11 presents a flowchart of the decision-making process by which a white node changes its color or otherwise secures its place in the network, FIGS. 12 and 13 show similar flowcharts for the Green and Black nodes respectively.

These processes are conducted through the transmission and reception of "Hello" messages that each network node broadcasts periodically for two-way communication with its neighbors. For leaf nodes, the beacon messages serve as the Hello messages. Likewise, cluster head nodes and regional head nodes also communicate with their Hello messages for updating and maintaining the CST and GST respectively.

In FIG. 11, upon receiving a Hello message, a White node W first determines whether the message is from a non-White node W10. If the answer is Yes, W then determines whether the transmitting node is a Black node W12. Where the message is received from a Black node, the white node W selects the most preferred Black node (from those in its vicinity) as its Primary Access Point and in the process turns itself Green W22. However, if the message from the non-white node is not from a Black node, it must be from a Green node, and then W selects the most preferred Green node from its neighborhood as its Primary Access Point (PAP) for accessing the network W14, whereby the selected Green node turns itself into a Black node and updates the neighbors of its change in color W15.

Where, on the other hand, the message received by W is from another White node W20 and W has Black neighbors, then W, as before, selects the most preferred Black node (from those in its vicinity) as its Primary Access Point, in the process turning itself Green W22. If, however, W does not have any Black neighbors but has Green neighbors W30, W again selects from among them W32 the most preferred Green neighbor as its PAP which turns Black, while W turns Green W14. Where W has only one Green neighbor, it selects that Green node as its PAP W33 turning it Black, even as W itself turns Green, and updating the neighbors accordingly W35. Furthermore, where W finds it has only White node neighbors, it either asks its most preferred local White node neighbor W42 to turn Black W44 if the Backbone Section Timer (BS Timer) W40 has expired or, if it has not, W waits for additional Hello messages W50. (When a node powers on for the first time, it starts a Backbone Selection Timer, and the Primary Backbone Selection ends when the BS Timer expires.)

FIG. 12 depicts the analytical framework used by a Green node G upon receiving a Hello message. If G the received message is from a Black node G10, G verifies whether it is from G's PAP G12 in which case G updates the PAP validity timer G14 that maintains the PAP's validity as a result of being refreshed within the required time. If the PAP validity timer is not refreshed within the next Hello time, the PAP is no longer considered valid and G starts a new PAP selection process by updating and consulting its Neighbor Table, which lists all one-hop neighbors. On the other hand, if the message from the Black neighbor is not from G's PAP, G updates its Black node table.

Where the Hello message received by G is from a Green node neighbor G20 whose PAP is listed in G's BNT G22, G updates its one-hop neighbor table (also residing at G) G24. If however, the PAP of the Green node neighbor is not listed in G's BNT, G confirms whether this presents a BGGB problem requiring resolution G23, as described below. If, on the other hand, it does not present a BGGB case, continued attempts are made to identify the nature of the required connection G25.

The case where G receives a Hello message from a White node is relatively simple. If G is PAP of the HELLO sender G30, G turns its own color Black G32, thereby causing the White node to turn Green. If, however, G is not HELLO sender's PAP, it waits for additional messages G40.

FIG. 13 presents the case where the Hello message B10 is received by a Black node B. If the message is received from another Black node, B simply updates its own BNT B12. If, however the message is from a Green node B20, B determines whether it is such Green node's PAP B22, in which case B updates its PAP validity timer B24, but, if it is not, then B checks to see if the sender's PAP is listed in B's BNT B23, in which event B updates its one-hop neighbor list B26.

If the message is from a Green node for which B is neither a PAP nor does it have the Green node's PAP listed in its BNT, B looks for a BGB condition (as described below) for resolution B25. If no BGB situation exists, B updates its one-hop neighbor table B27. Where the message is received from White node, B simply responds with a Hello message B30 acknowledging its presence so that the White node can select B as its PAP.

B. Backbone Connection: Once the nodes selected as the primary backbone tree nodes have been designated Black and all of the remaining nodes have been designated Green, the backbone connection algorithm connects all the Black nodes to form the primary backbone tree. This may not be possible in some instances, however, without selecting additional nodes for the primary backbone tree if the Black designated nodes are not contiguous, as in FIGS. 10 and 14. In particular, two cases may arise: two Black nodes may be separated by a Green node (the B-G-B case in FIG. 10) or two Black nodes may be separated by two Green nodes (the B-G-G-B case in FIG. 14). The B-G-B case is easy to resolve: one of the Black nodes requests the intermediate Green node to turn Black and become part of the backbone tree; this then allows the backbone tree connections to be completed. For instance, in FIG. 10, Black node H, one of the Green nodes (either J or K), and the Command Center present the B-G-B case, which can be resolved by having one of the Green nodes, say J, turn Black.

Figure 14:
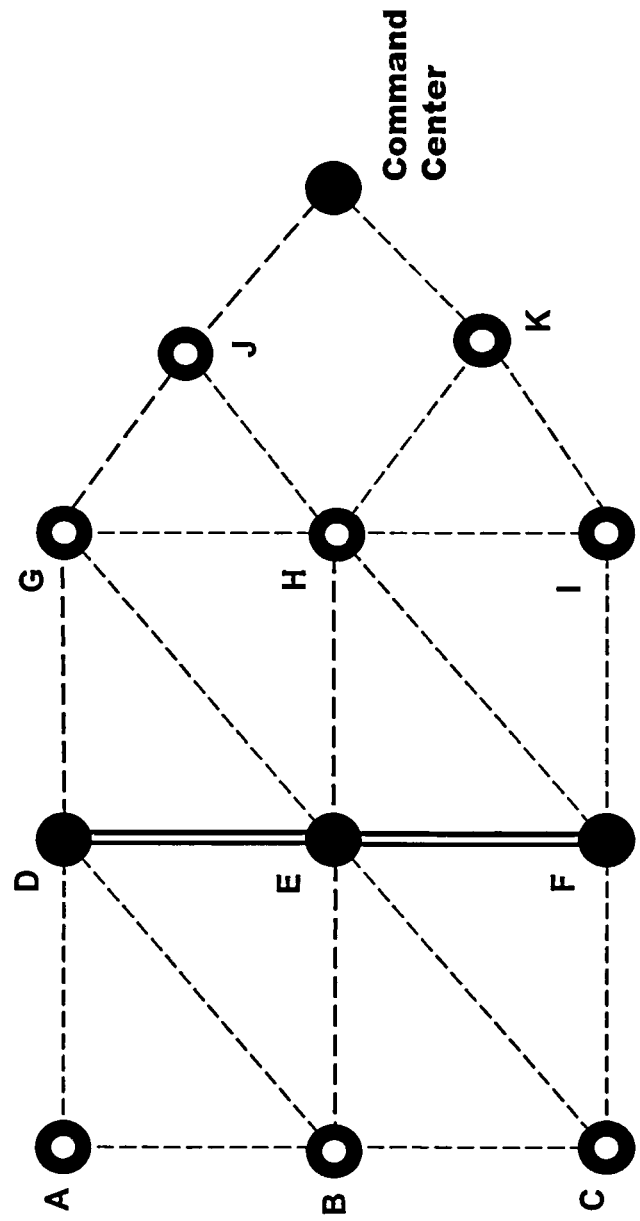
FIG. 14 presents an example of a primary backbone tree B-G-G-B connection.

Resolving the B-G-G-B case presents greater complexity. For instance, in FIG. 14, the backbone selection completes with node D and node F as Black nodes. Through the B-G-B backbone connection algorithm, node E also becomes a Black node. As shown in FIG. 14, however, the backbone tree cannot yet be fully connected without first resolving one of the B-G-G-B conditions, such as those existing among D-G-J-Command Center nodes, F-I-K-Command Center nodes, F-H-J-Command Center nodes, E-G-J-Command Center nodes, E-H-J-Command Center nodes, and E-H-K-Command Center nodes.

The following presents an example of the B-G-G-B backbone tree node connection for the network of FIG. 14.

The Green node J sees its neighbor H as Green, which means H has a Black neighbor, namely E, which is not also a 1-hop neighbor of node J. (It may be noted that any of the other Green nodes, namely node K, node G, or node H could as well have detected the B-G-G-B condition between the Command Center and node E, and initiated the B-G-G-B backbone tree connection process.)

Node J reports this condition to its only 1-hop Black neighbor (i.e., the Command Center). The Black Command Center neighbor verifies that it has no alternative tree connection to E, e.g. through an alternative resolved BGB or BGGB path. This ability to verify whether any alternative resolved paths exists require each Black node to maintain a list of all reachable Black nodes in the network.

The Command Center then sends out a Backbone Connection Message (BCM) 1525 to node J destined for node E. (FIG. 15) The BCM is a source routed control message with its time-to-live value set at 3 (i.e. TTL=3).

Upon receiving the BCM, node J makes a note of an impending color change and forwards the BCM to node H with the TTL decremented to 2.

Similarly, upon receiving the BCM from node J, node H makes a note of an impending color change and forwards the BCM to node E with the TTL decremented to 1.

Figure 15:
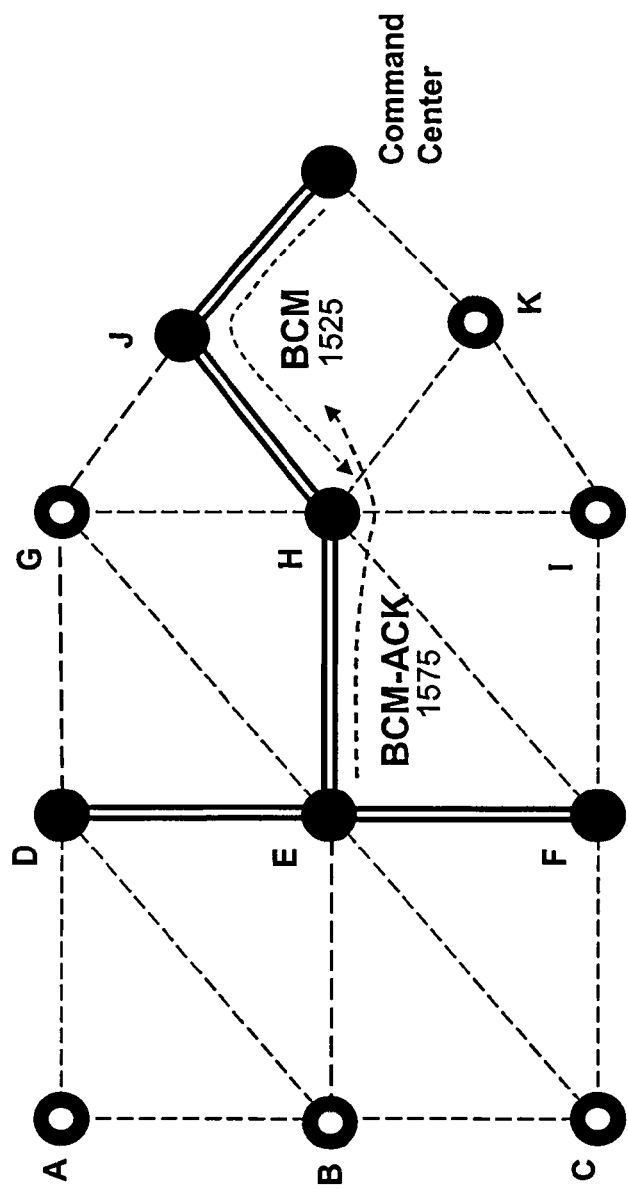
FIG. 15 shows resolution of the primary backbone tree B-G-G-B connection issue.

When node E receives the BCM sent by the Command Center, it verifies that there is no other BGB or BGGB path to the Command Center. Node E then generates a BCM-ACK message (Backbone Connection Message-Acknowledge message) 1575 destined for the Command Center. The BCM-ACK is received by node H and forwarded to node J. Upon receiving BCM-ACK, nodes H and J turn Black. The B-G-G-B backbone connection process completes when BCM-ACK is received from node J by the Command Center (i.e., the BCM generator). FIG. 15 illustrates the outcome of this backbone tree connection process where the B-G-G-B condition has been resolved and the Black E-H-J-Command Center nodes have been connected to complete the construction of the primary backbone tree. Alternatively, the BGGB connection could similarly be established via E-H-K-Command Center or E-G-J-Command Center. The first to complete the BGGB connection establishes the backbone tree path.

C. Backbone Maintenance: The network topology is expected to change frequently and unpredictably in the mobile ad hoc communication networks. New and existing nodes and clusters are expected to join and leave the network arbitrarily during the lifetime of the network. The backbone maintenance algorithm accommodates these changes and dynamically maintains the required connectivity.

Two basic principles govern the backbone maintenance algorithm:
 1. At all times, all Green nodes should be no more than 1-hop away from at least one Black node.
 2. When new BGB or BGGB conditions are detected due to network dynamics (i.e., node mobility, node failure, or new node joining), the backbone tree may change shape, but must remain fully connected.

Figure 16:
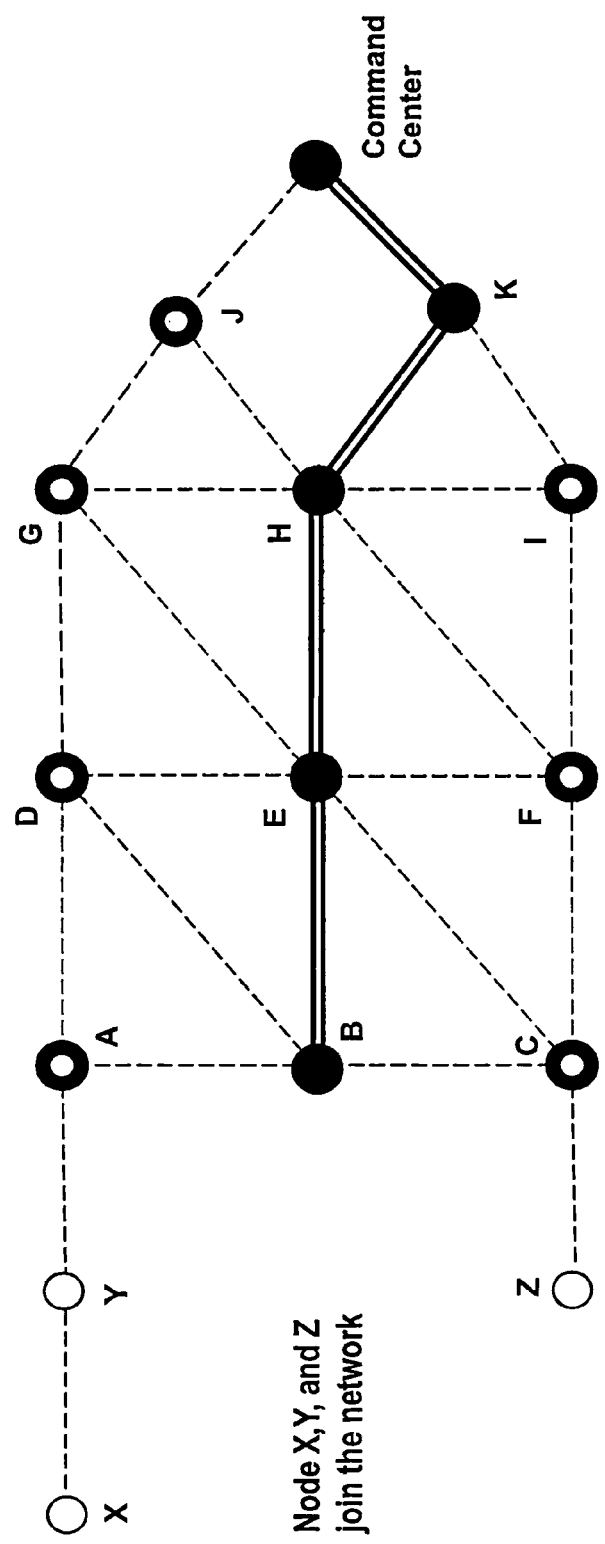
FIG. 16 presents primary backbone tree maintenance issues associated with new nodes joining the network.

FIG. 16 illustrates, by way of example, the operation of the backbone maintenance process. Here, new nodes X, Y, and Z join an existing ad hoc wireless network.

When the single node Z joins the network, it only sees node C, which is Green, as its neighbor. Node Z then simply requests node C to turn Black and colors itself Green. Node C acknowledges that it is the access point for node Z and colors itself Black. (All Black nodes are access points for at least one other node.).

Figure 17:
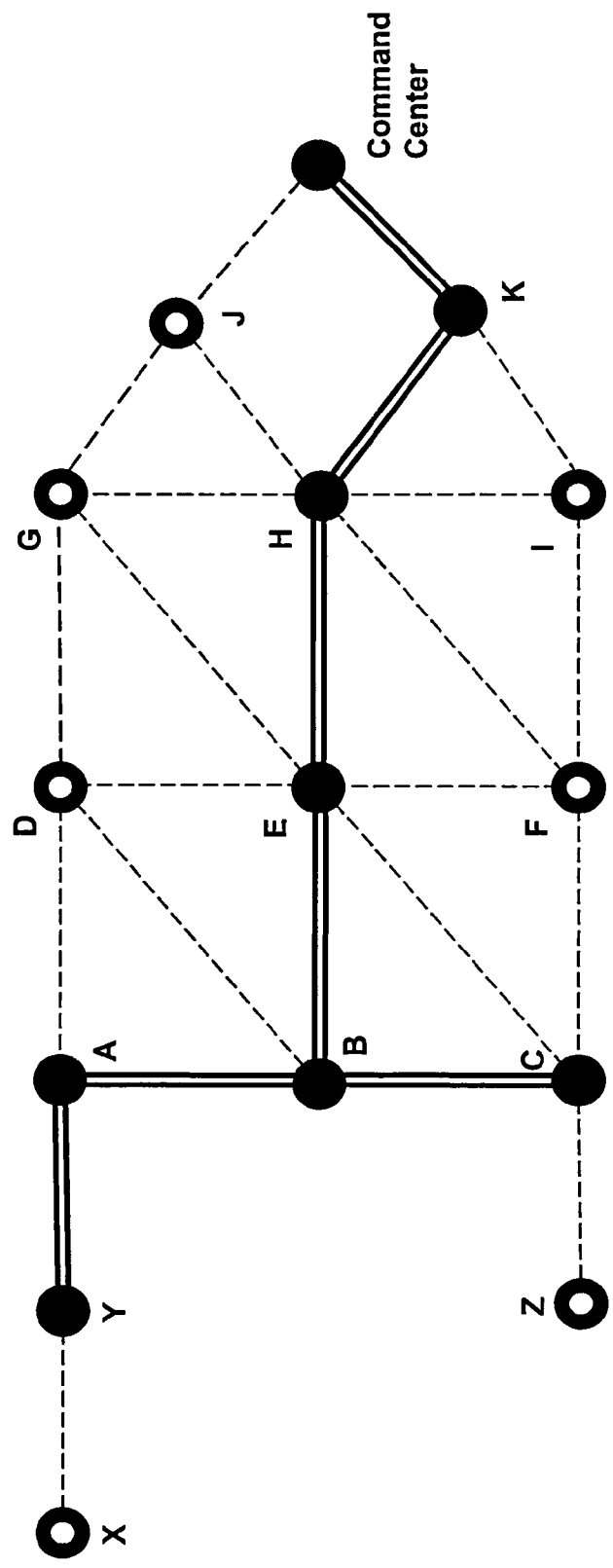
FIG. 17 shows integration of the new nodes into the network and continued maintenance of the primary backbone tree.

When multiple new nodes join the network, e.g. the two nodes X and Y in FIG. 16, there can be alternate ways to accommodate them. For instance, node X sees only node Y as its neighbor and requests node Y to become a Black backbone node. This turns node Y Black and node X Green. This, in turn, results in a BGB case of Y(black)-A(Green)-B(Black), which is resolved by the BGB backbone connection algorithm, i.e. turning node A from Green to Black. Alternatively, node Y sees node A as its only Green colored neighbor (indicating that a backbone node is 1-hop away from node A), and generates a BCM request to convert node A into a Black backbone node, thereby turning node Y Green. In the subsequent step, node X sends a BCM request to node Y so that node Y becomes Black and X becomes Green. FIG. 17 illustrates the final outcome of this process.

Secondary Backbone Tree Construction:

Once the primary backbone tree, e.g. 710, is constructed, the secondary backbone tree, e.g. 750, is created with the available Green high capability cluster head and regional head nodes that are not a part of the primary backbone tree, the sole exception being the Command Center, which, although Black, is at the root of both the primary and secondary backbone trees. Although the secondary backbone tree construction runs independently of the primary backbone tree construction, the node selection choices available for the secondary backbone tree are limited by the nodes already selected for the primary backbone tree. The secondary backbone tree avoids incorporating within it any Black node unless its inclusion is unavoidable for establishing node-to-node connectivity.

The underlying secondary backbone tree construction process is similar to that for the primary backbone tree, except that, as discussed, the secondary backbone tree construction avoids, so far as possible, the inclusion of any of the primary backbone tree Black nodes in the secondary backbone tree. To better understand the secondary backbone tree construction, different node identifiers are used below. An analogous color-based node labeling, with Blue substituted for Black and Grey substituted for Green, is used for the secondary backbone tree nodes. As shown for the secondary backbone tree 750 in FIG. 7, Grey nodes appear in the figures of this disclosure as open triangles, and Blue nodes as open squares.

The Blue nodes are chosen in accordance with the following rules:
 1. The Command Center node is colored both Black and Blue because both the primary and secondary backbone trees are rooted at the Command Center.
 2. If a node's only neighbor is a Black node, that Black node also serves as a Blue node of the secondary backbone tree for such node.
 3. The 1-hop node neighbor of a Blue node is a Grey node. (The Grey nodes of the secondary backbone tree correspond to the Green nodes of the primary backbone tree.)
 4. A Green node of the primary backbone tree can become either a Blue or a Grey node of the secondary backbone tree.

To the extent possible, the inclusion of the primary backbone tree nodes (i.e., Black nodes) in the secondary backbone tree is avoided, i.e. a Black node of the primary backbone tree should not also serve as a Blue node of the secondary backbone tree unless it becomes unavoidable (for example, where it is the only node that can provide the required secondary backbone tree connectivity).

The same processes as those used for the primary backbone tree nodes are used for secondary backbone tree node selection and backbone tree connection. For instance, the same BGB and BGGB connection algorithms are applied, as above, except that now B represents Blue and G represents Grey in the secondary backbone tree selection and connection algorithm.

Figure 18:
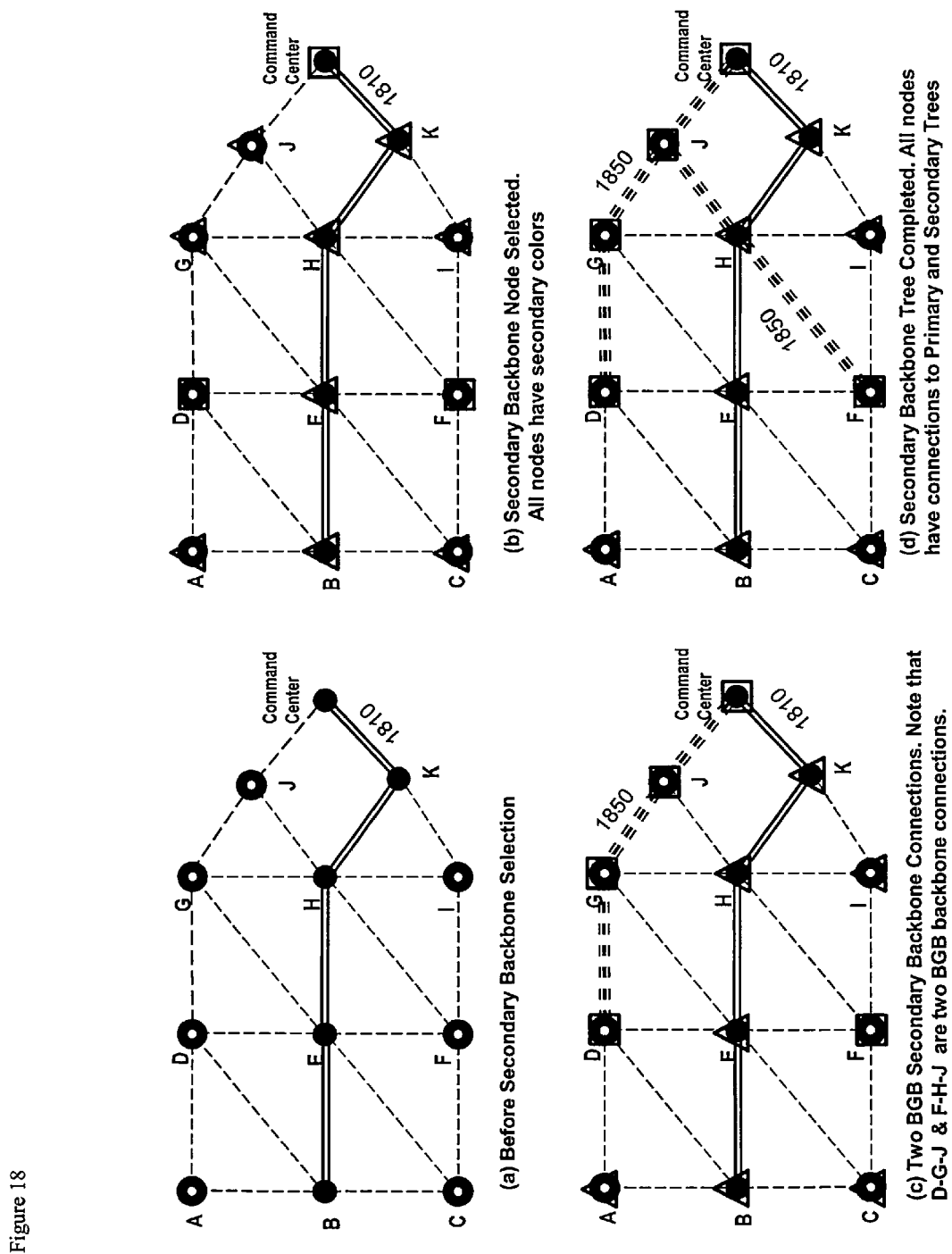
FIG. 18 shows secondary backbone tree construction.

FIG. 18, which in FIG. 18(*a*) shows the connected primary backbone tree 1810 as the starting point, exemplifies the secondary backbone tree 1850 construction details. Since the Command Center is at the root of both the secondary backbone tree and the primary backbone tree, it is colored both Black and Blue. And since node J, for example, is a Green node of the primary backbone tree that is just one hop away from the Command Center, it is available for incorporation into the secondary backbone tree. It, therefore, appears Grey in FIG. 18(*b*). Thus, the initial topology (following the primary backbone tree construction) has a Grey node (J) that neighbors a Blue node (the Command Center).

If node D and node F have been pre-selected as secondary backbone tree nodes (i.e., Blue in color), as depicted in FIG. 18(*b*), then one-hop neighbors of the Blue nodes that are preferably not part of the primary backbone tree (namely, A, C, G, I) become Grey nodes. Where B-G-B and B-G-G-B cases are detected here, the secondary backbone tree connection algorithm is executed to resolve the B-G-B and B-G-G-B cases as with the primary backbone tree construction.

The secondary backbone tree connection process is the same as that used for the primary backbone tree connection. The D-G-J-Command Center connections of FIG. 18(*b*), represent the B-G-G-B case. As seen in FIG. 18(*c*), G and J are forced to become Blue nodes by the backbone connection algorithm. However, also as seen in FIG. 18(*c*), resolution of this FIG. 18(*b*) B-G-G-B case creates B-G-B situations from node F, for instance, F-E-D, F-E-G, or F-H-J. The backbone connection process completes when the B-G-B case is resolved and all the required secondary backbone tree nodes are connected. FIG. 18(*d*). The reason that node F connects to node J instead of node D or node G in this example is that node J provides the least hop count from node F to the Command Center. In the event of a networking problem, such as congestion at node H, node F can alternatively choose either node D or node G instead of node J.

Node H doubles both as a Black node and a Blue node, being a part of both the primary 1810 and secondary 1850 backbone trees. As discussed earlier, the selection of node H here is unavoidable in order to provide full connectivity to the secondary backbone tree. At any such node that is common to both the primary and secondary backbone trees, a strict priority and preemption rule is enforced that favors traffic flows of the primary backbone tree over those of the secondary backbone tree.

In one embodiment, the network nodes have directional antenna access to at least one node of the primary backbone tree, e.g. 1810 and one node of the secondary backbone tree, e.g. 1850, which nodes serve as the access points for the two trees. (The exception, however, is where a node just has a single one-hop neighbor, in which case such neighbor serves as the common access point for both backbone trees.) Thus, Green nodes or Grey nodes can have one antenna pointing towards Black nodes for high priority traffic, and another antenna (or the same antenna on a time-shared basis) pointing towards Blue nodes for low priority traffic. Regarding nodes that populate the two trees, the Black nodes would point their antennas towards Blue nodes for low priority traffic, while the Blue nodes would point their antennas towards Black nodes for high priority traffic.

It is possible for a node to have multiple access points for either or both of the backbone tree paths. For instance, where a Green node has three one-hop Black node neighbors, the Green node would switch or steer its antenna (depending on its antenna type) to one of the three Black node neighbors for accessing the primary backbone tree path.

Figure 19:
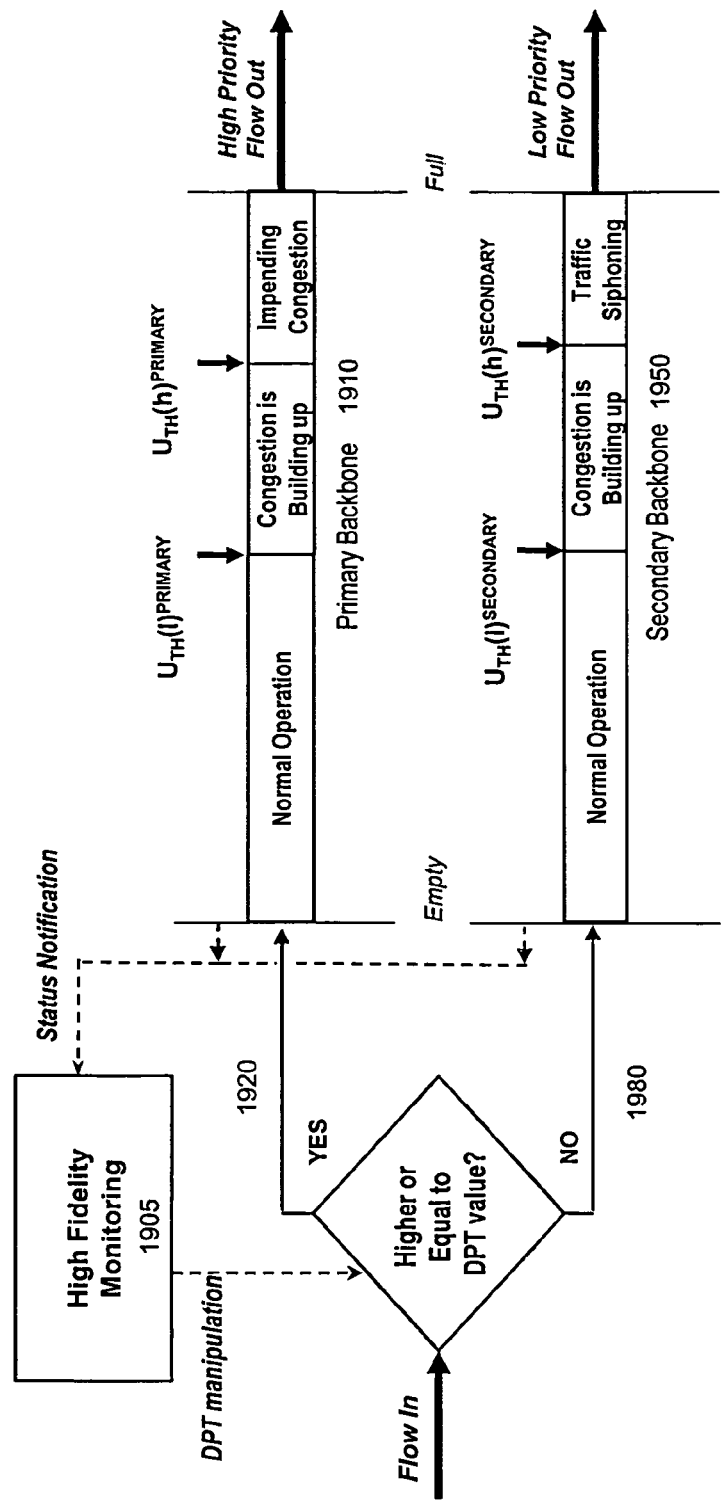
FIG. 19 presents a schematic sketch showing High Fidelity Monitoring and Dynamic Priority Threshold mechanism.

FIG. 19 illustrates the Dynamic Priority Threshold (DPT) mechanism using High Fidelity Monitoring 1905 for protecting the high priority flows in the two backbone tree architecture. When a node needs to transport data traffic to a destination, it first determines which backbone tree path to use based on the priority level of the traffic flow and the current DPT value. The DPT value is a configurable system parameter that can be changed depending on the current network condition. If the planned traffic flow has equal or higher priority to that of the DPT 1920, the traffic flow is transported over the primary backbone tree 1910. If it has a lower priority, i.e. 1980, the traffic flow is transported over the secondary backbone tree 1950.

High Fidelity Monitoring (HFM) 1905 of the traffic flow is required to determine the most effective DPT value. HFM utilizes the network knowledge gained during the course of the multi-layered data traffic management process. In one embodiment, it includes monitoring of the network through the NST 300, CST 400, and GST 500, and edge-to-edge probing for determining the causes of any problems encountered, such as increased packet delivery loss, to allow prompt resolution. For example, when the traffic flow from node A to node B manifests an increased packet loss, the edge-to-edge probing can determine whether the packet loss is due to congestion or intermittent link failure. If the packets are received with increasing end-to-end delay, it is very likely that the packet losses are due to congestion. If, alternatively, the packet losses are bursty, and some packets are received without end-to-end delay, it is likely the traffic is experiencing intermittent connectivity.

Where the DPT value is set too high, the primary backbone tree is underutilized. Where the DPT value is set too low, the traffic flow integrity protection facilitated by the primary tree is compromised. HFM 1905 tracks the bandwidth usage via the proxy measure of queue length. Upper and lower utilization thresholds, $U_{TH}(h)$ and $U_{TH}(l)$ respectively, are set for each of the primary 1910 and secondary 1950 backbone trees, to assess their individual utilization levels ($U_{LEVEL}$). Bandwidth usage below $U_{TH}(\ )$ represents normal operation, but once it exceeds $U_{TH}(\ )$ it is considered that traffic is building up towards congestion. $U_{TH}(h)$ represents the upper threshold beyond which the link is considered to be in a congested state.

When the $U_{LEVEL}$ exceeds the $U_{TH}(h)$ of the primary backbone tree 1910 ($U_{TH}(h)^{PRIMARY}$), the DPT is raised to a higher value, causing the lowest priority flows originally transported along the primary backbone tree to be diverted to the secondary backbone tree 1950. These diverted flows from the primary backbone tree 1910 comprise the highest priority flows in the secondary backbone tree 1950. This diversion of the lowest priority traffic of the primary backbone tree frees up its networking resources, and lowers its utilization level. Packet loss due to lack of resources is avoided, and the integrity of high priority traffic flow in the primary backbone tree is maintained.

With the raising of the DPT value, the $U_{LEVEL}^{SECONDARY}$ also increases. This has the potential to unfavorably impact the lower priority flows in the secondary backbone tree 1950 if $U_{LEVEL}^{SECONDARY}$ exceeds $U_{TH}(h)^{SECONDARY}$. Therefore, when the $U_{LEVEL}^{SECONDARY} > U_{TH}(h)^{SECONDARY}$ condition is met, traffic siphoning 850 (FIG. 8) is initiated to temporarily exploit the unutilized portion of the network and thereby reduce the traffic load on the secondary backbone tree 1950. The traffic siphoning is typically implemented when both backbone trees are saturated with high priority flows. Traffic siphoning involves the transport of the higher priority flows of the secondary backbone tree via networking resources that are not part of either of the backbone trees.

The network using the present topology management invention provides significantly improved Packet Delivery Percentages (PDPs) for all traffic flows. Such improvements result from the balanced use of network resources, via the construction and maintenance of the backbone trees, to distribute the traffic load across the network. Simulation shows that in a wireless communications network using this system the high priority flows achieve 100% PDP under all network loading conditions. The low priority traffic, on the other hand, experiences increased PDP degradation with increasing network congestion, eventually resulting in the best effort traffic being completely denied transport under very high network loading conditions. As the network load increases, the higher priority flows are protected and only the least priority traffic is impacted, consistent with the desired network performance.

We claim:

1. A topology management system for mobile ad hoc wireless communication networks comprising:
    A plurality of mobile nodes organized in a multiple level hierarchical mobile ad hoc network, wherein nodes at each level are managed by nodes at the next higher level;
    at least two priority-based backbone tree paths dynamically constructed of said mobile network nodes for traffic flow, said priority-based backbone tree paths including at least one primary backbone tree path for high priority traffic flow and at least one secondary backbone tree path for low priority traffic flow, said primary backbone tree path construction preceding said secondary backbone tree path construction and said high priority and low priority traffic transmitted simultaneously over said respective primary and secondary backbone tree paths, and wherein priority-aware traffic load balancing between said primary and secondary backbone tree paths is achieved using a dynamically adjustable Dynamic Priority Threshold (DPT) value separating the high priority traffic from the low priority traffic; and
    means for dynamically maintaining the connectivities of the multiple backbone tree paths and high priority traffic flows during the changing topologies of the mobile ad hoc network.

2. The system of claim 1, wherein the nodes are organized according to their networking capabilities.

3. The system of claim 2, wherein the priority-based backbone tree paths are constructed by selecting and connecting high capability nodes.

4. The system of claim 3, wherein each unselected network node is one-hop away from at least one connected backbone tree node.

5. The system of claim 1, wherein the multiple level hierarchical network includes a three level hierarchical network.

6. The system of claim 5, wherein the three level hierarchical network includes a first level of leaf nodes, a second level of cluster head nodes, and a third level of regional head nodes.

7. The system of claim 6, wherein leaf nodes are managed by cluster head nodes.

8. The system of claim 6, wherein cluster head nodes are managed by regional head nodes.

9. The system of claim 6, wherein regional head nodes are managed by a Command Center.

10. The system of claim 6, wherein leaf nodes are organized in a Neighborhood Status Table.

11. The system of claim 6, wherein cluster head nodes are organized in a Cluster Status Table.

12. The system of claim 6, wherein the regional head nodes are organized in a Global Status Table.

13. The system of claim 1, wherein at least one network node has directional antenna access to at least one node of a primary backbone tree path and at least one node of a secondary backbone tree path.

14. The system of claim 3, wherein high capability nodes include cluster head nodes and regional head nodes.

15. The system of claim 1, wherein dynamically maintaining high priority traffic flows includes protecting said high priority traffic flows using the Dynamic Priority Threshold (DPT) mechanism.

16. The system of claim 1, wherein dynamically maintaining the high priority traffic flows includes traffic siphoning.

17. The system of claim 16, wherein traffic siphoning includes traffic flow in the existing unutilized part of the mobile ad hoc network.

18. The system of claim 15, wherein using the Dynamic Priority Threshold (DPT) mechanism includes High Fidelity Monitoring of the traffic flow.

19. A topology management system for mobile ad hoc wireless communication networks comprising:
    A plurality of mobile nodes organized in a three level hierarchical mobile ad hoc network, wherein nodes at each level are managed by nodes at the next higher level;
    two priority-based backbone tree paths dynamically constructed of said mobile ad hoc network nodes for traffic flow, said priority-based backbone tree paths including one primary backbone tree path for high priority traffic flow and one secondary backbone tree path for lower priority traffic flow, wherein the primary backbone tree path construction precedes the secondary backbone tree path construction and said high priority and low priority traffic are transmitted simultaneously over said respective primary and secondary backbone tree paths, and wherein priority-aware traffic load balancing between said primary and secondary backbone tree paths is achieved using a dynamically adjustable Dynamic Priority Threshold (DPT) value separating the high priority traffic from the low priority traffic; and
    directional communication links for dynamically maintaining the connectivities of the two backbone tree paths and high priority traffic flows during the changing topologies and traffic patterns of said mobile ad hoc network.

20. The system of claim 19, wherein the nodes are organized according to their networking capabilities.

21. The system of claim 20, wherein the priority-based backbone tree paths are constructed by selecting and connecting high capability nodes.

22. The system of claim 21, wherein each unselected network node is one-hop away from at least one connected backbone tree node.

23. The system of claim 19, wherein the three level hierarchical network includes a first level of leaf nodes, a second level of cluster head nodes, and a third level of regional head nodes.

24. The system of claim 23, wherein leaf nodes are managed by cluster head nodes.

25. The system of claim 23, wherein cluster head nodes are managed by regional head nodes.

26. The system of claim 23, wherein regional head nodes are managed by a Command Center.

27. The system of claim 23, wherein leaf nodes are organized in a Neighborhood Status Table.

28. The system of claim 23, wherein cluster head nodes are organized in a Cluster Status Table.

29. The system of claim 23, wherein regional head nodes are organized in a Global Status Table.

30. The system of claim 21, wherein high capability nodes include cluster head nodes and regional head nodes.

31. The system of claim 19, wherein dynamically maintaining high priority traffic flows includes protecting said high priority traffic flows.using the Dynamic Priority Threshold (DPT) mechanism.

32. The system of claim 19, wherein means for dynamically maintaining high priority traffic flows includes means for traffic siphoning.

33. The system of claim 32, wherein traffic siphoning includes traffic flow in the existing unutilized part of the mobile ad hoc network.

34. The system of claim 31, wherein using the Dynamic Priority Threshold (DPT) mechanism includes High Fidelity Monitoring of the traffic flow.

35. A method for topology management of mobile ad hoc wireless communication networks comprising the steps of:
organizing and managing a plurality of mobile nodes in a multiple level hierarchical mobile ad hoc network;
dynamically constructing multiple priority-based backbone tree paths for traffic flows across said mobile ad hoc network by selecting and connecting mobile network nodes, said backbone tree paths including at least one primary backbone tree path for high priority traffic flow and at least one secondary backbone tree path for lower priority traffic flow, wherein the primary backbone tree path construction precedes the secondary backbone tree path construction ;
transmitting said high priority and low priority traffic simultaneously over said respective primary and secondary backbone tree paths;
implementing priority-aware traffic load balancing between said primary and secondary backbone tree paths using a dynamically adjustable Dynamic Priority Threshold (DPT) value separating the high priority traffic from the low priority traffic; and
dynamically maintaining the connectivities of the multiple backbone tree paths and high priority traffic flows during the changing topologies of said mobile ad hoc network.

36. The method of claim 35, wherein nodes are organized according to their networking capabilities.

37. The method of claim 35, wherein the multiple level hierarchical mobile ad hoc network includes a three level hierarchical mobile ad hoc network.

38. The method of claim 37, wherein the three level hierarchical network includes a first level of leaf nodes, a second level of cluster head nodes, and a third level of regional head nodes.

39. The method of claim 38, wherein leaf nodes are managed by cluster head nodes, and said cluster head nodes are managed by regional head nodes.

40. The method of claim 38, wherein regional head nodes are managed by a Command Center.

41. The method of claim 38, wherein leaf nodes are organized in a Neighborhood Status Table.

42. The method of claim 38, wherein cluster head nodes are organized in a Cluster Status Table.

43. The method of claim 38, wherein the regional head nodes are organized in a Global Status Table.

44. The method of claim 35, wherein multiple priority-based backbone tree paths includes two priority-based backbone tree paths:

45. The method of claim 44, wherein the two priority-based backbone tree paths include a primary backbone tree path and a secondary backbone tree path.

46. The method of claim 45 wherein the primary backbone tree path transports high priority traffic flows.

47. The method of claim 45, wherein the secondary backbone tree path transports low priority and delay tolerant traffic flows.

48. The method of claim 35, wherein the high capability nodes include cluster head nodes and regional head nodes.

49. The method of claim 35, wherein dynamically maintaining high priority traffic flows includes protecting said high priority traffic flows using the Dynamic Priority Threshold (DPT) mechanism.

50. The method of claim 35, wherein dynamically maintaining high priority traffic flows includes traffic siphoning.

51. The method of claim 50, wherein traffic siphoning includes traffic flow in the existing unutilized part of the mobile ad hoc network.

52. The method of claim 49, wherein using the Dynamic Priority Threshold (DPT) mechanism includes High Fidelity Monitoring of the traffic flow.

53. A method for topology management of mobile ad hoc wireless communication networks comprising the steps of:
organizing and managing a plurality of mobile nodes according to their networking capabilities in a three level hierarchical mobile ad hoc network;
dynamically constructing two priority-based backbone tree paths for traffic flows across said mobile ad hoc network by selecting and connecting mobile network nodes, said backbone tree paths including one primary backbone tree path for high priority traffic flow and one secondary backbone tree path for lower priority traffic flow, wherein the primary backbone tree path construction precedes the secondary backbone tree path construction;
transmitting said high priority and low priority traffic simultaneously over said respective primary and secondary backbone tree paths;
implementing priority-aware dynamic traffic load balancing between said primary and secondary backbone tree paths using a dynamically adjustable Dynamic Priority Threshold (DPT) value separating the high priority traffic from the low priority traffic; and
configuring the communication links of the two backbone tree paths dynamically to maintain the high priority traffic flows during the changing topologies and traffic patterns of said mobile ad hoc network.

54. The method of claim 53, wherein the three level hierarchical network includes a first level of leaf nodes, a second level of cluster head nodes, and a third level of regional head nodes.

55. The method of claim 54, wherein leaf nodes are managed by cluster head nodes.

56. The method of claim 54, wherein cluster head nodes are managed by regional head nodes.

57. The method of claim 54, wherein regional head nodes are managed by a Command Center.

58. The method of claim 54, wherein leaf nodes are organized in a Neighborhood Status Table.

59. The method of claim 54, wherein cluster head nodes are organized in a Cluster Status Table.

60. The method of claim 54, wherein the regional head nodes are organized in a Global Status Table.

61. The method of claim 53, wherein the priority-based backbone tree paths are constructed by selecting and connecting high capability nodes including cluster head nodes and regional head nodes.

62. The method of claim 53, wherein dynamically maintaining high priority traffic flows includes protecting said high priority traffic flows using the Dynamic Priority Threshold (DPT) mechanism.

63. The method of claim 53, wherein dynamically maintaining the high priority traffic flows includes traffic siphoning.

64. The method of claim 63, wherein traffic siphoning includes traffic flow in the existing unutilized part of the mobile ad hoc network.

65. The method of claim 62, wherein using the Dynamic Priority Threshold (DPT) mechanism includes High Fidelity Monitoring of the traffic flow.

* * * * *